United States Patent
Tsuchihashi et al.

(10) Patent No.: US 11,067,766 B2
(45) Date of Patent: Jul. 20, 2021

(54) IMAGE FORMING APPARATUS

(71) Applicant: CANON KABUSHIKI KAISHA, Tokyo (JP)

(72) Inventors: Naoto Tsuchihashi, Yokohama (JP); Atsushi Iwasaki, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/866,772

(22) Filed: May 5, 2020

(65) Prior Publication Data
US 2020/0264399 A1    Aug. 20, 2020

Related U.S. Application Data

(63) Continuation of application No. 15/828,628, filed on Dec. 1, 2017, now Pat. No. 10,684,443.

(30) Foreign Application Priority Data

Dec. 5, 2016    (JP) .............................. JP2016-236168

(51) Int. Cl.
*G03G 15/20* (2006.01)
*G02B 7/02* (2021.01)
(Continued)

(52) U.S. Cl.
CPC ............. *G02B 7/021* (2013.01); *G02B 7/028* (2013.01); *G02B 7/10* (2013.01); *G03G 15/20* (2013.01);
(Continued)

(58) Field of Classification Search
CPC ............... G03G 15/20; G03G 15/2017; G03G 15/2042; G03G 21/14; G03G 21/20;
(Continued)

(56) References Cited

U.S. PATENT DOCUMENTS

| 7,023,629 B2 | 4/2006 | Sekine et al. |
| 7,193,181 B2 | 3/2007 | Makihira et al. |

(Continued)

FOREIGN PATENT DOCUMENTS

| JP | 60-136779 A | 7/1985 |
| JP | 08-234620 A | 9/1996 |

(Continued)

OTHER PUBLICATIONS

Japanese Office Action dated Aug. 25, 2020 in counterpart Japanese Patent Appln. No. 2016-236168.

*Primary Examiner* — Hoang X Ngo

(74) *Attorney, Agent, or Firm* — Venable LLP

(57) ABSTRACT

An apparatus includes a control portion. When a toner image formed on a first recording material is fixed onto the first recording material by the fixing portion, and then an image is formed on a second recording material of which width is larger than that of the first recording material, the control portion can execute a cooling sequence to cool a non-passing region of the fixing portion through which the second recording material passes but the first recording material does not pass, before the toner image formed on the second recording material is fixed by the fixing portion. The control portion sets an execution condition to execute the cooling sequence in accordance with information on the toner image in the region of the second recording material corresponding to the non-passing region.

20 Claims, 17 Drawing Sheets

(51) Int. Cl.
*G02B 7/10* (2021.01)
*G03G 21/20* (2006.01)
*G03G 21/14* (2006.01)

(52) U.S. Cl.
CPC ..... *G03G 15/2017* (2013.01); *G03G 15/2042* (2013.01); *G03G 21/14* (2013.01); *G03G 21/20* (2013.01); *G03G 21/206* (2013.01); *G03G 2215/2035* (2013.01)

(58) Field of Classification Search
CPC ......... G03G 21/206; G03G 2215/2035; G02B 7/021; G02B 7/028; G02B 7/10
See application file for complete search history.

(56) References Cited

U.S. PATENT DOCUMENTS

| | | | |
|---|---|---|---|
| 7,283,145 B2 | 10/2007 | Kato et al. | |
| 7,469,120 B2 | 12/2008 | Iwasaki et al. | |
| 7,974,563 B2 | 7/2011 | Sakai et al. | |
| 8,005,413 B2 | 8/2011 | Sakakibara et al. | |
| 8,224,223 B2 | 7/2012 | Sakakibara et al. | |
| 8,369,763 B2 | 2/2013 | Sakakibara et al. | |
| 8,626,046 B2 | 1/2014 | Sekihara et al. | |
| 8,768,194 B2 * | 7/2014 | Nakamura | G03G 15/2042 399/69 |
| 9,335,709 B2 | 5/2016 | Iwasaki et al. | |
| 9,372,456 B2 | 6/2016 | Kadowaki et al. | |
| 9,280,108 B2 | 8/2016 | Sato et al. | |
| 9,477,191 B2 | 10/2016 | Sato et al. | |
| 9,658,580 B2 | 5/2017 | Saito et al. | |
| 9,665,048 B2 | 5/2017 | Iwasaki et al. | |
| 9,760,049 B2 | 9/2017 | Kadowaki et al. | |
| 2015/0037052 A1 | 2/2015 | Muramatsu et al. | |
| 2018/0004134 A1 | 1/2018 | Nomura et al. | |
| 2018/0004135 A1 | 1/2018 | Sako et al. | |
| 2018/0004136 A1 | 1/2018 | Iwasaki | |

FOREIGN PATENT DOCUMENTS

| | | |
|---|---|---|
| JP | H11-073055 A | 3/1999 |
| JP | 2002-328556 A | 11/2002 |
| JP | 2003-076209 A | 3/2003 |
| JP | 2003-173103 A | 6/2003 |
| JP | 2004-212904 A | 7/2004 |
| JP | 2005-043454 A | 2/2005 |
| JP | 2013-195862 A | 9/2013 |

* cited by examiner

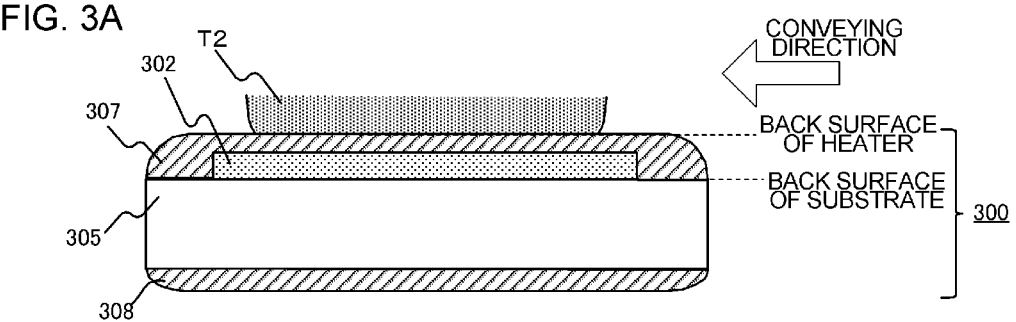
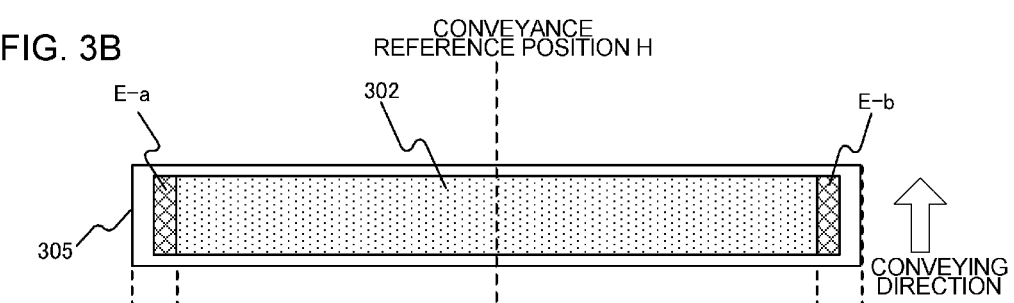
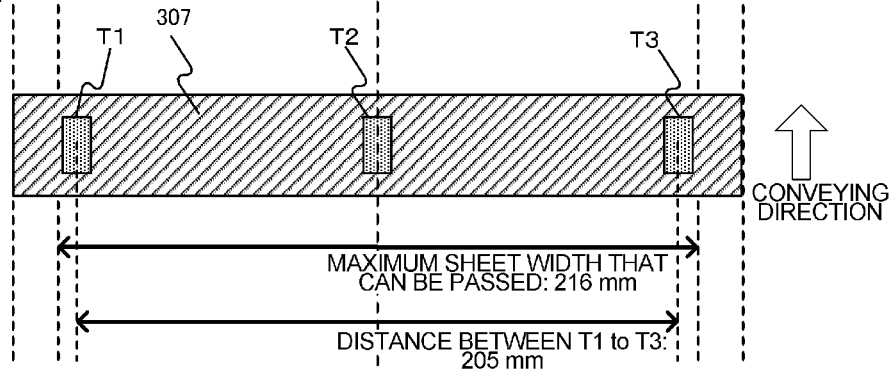

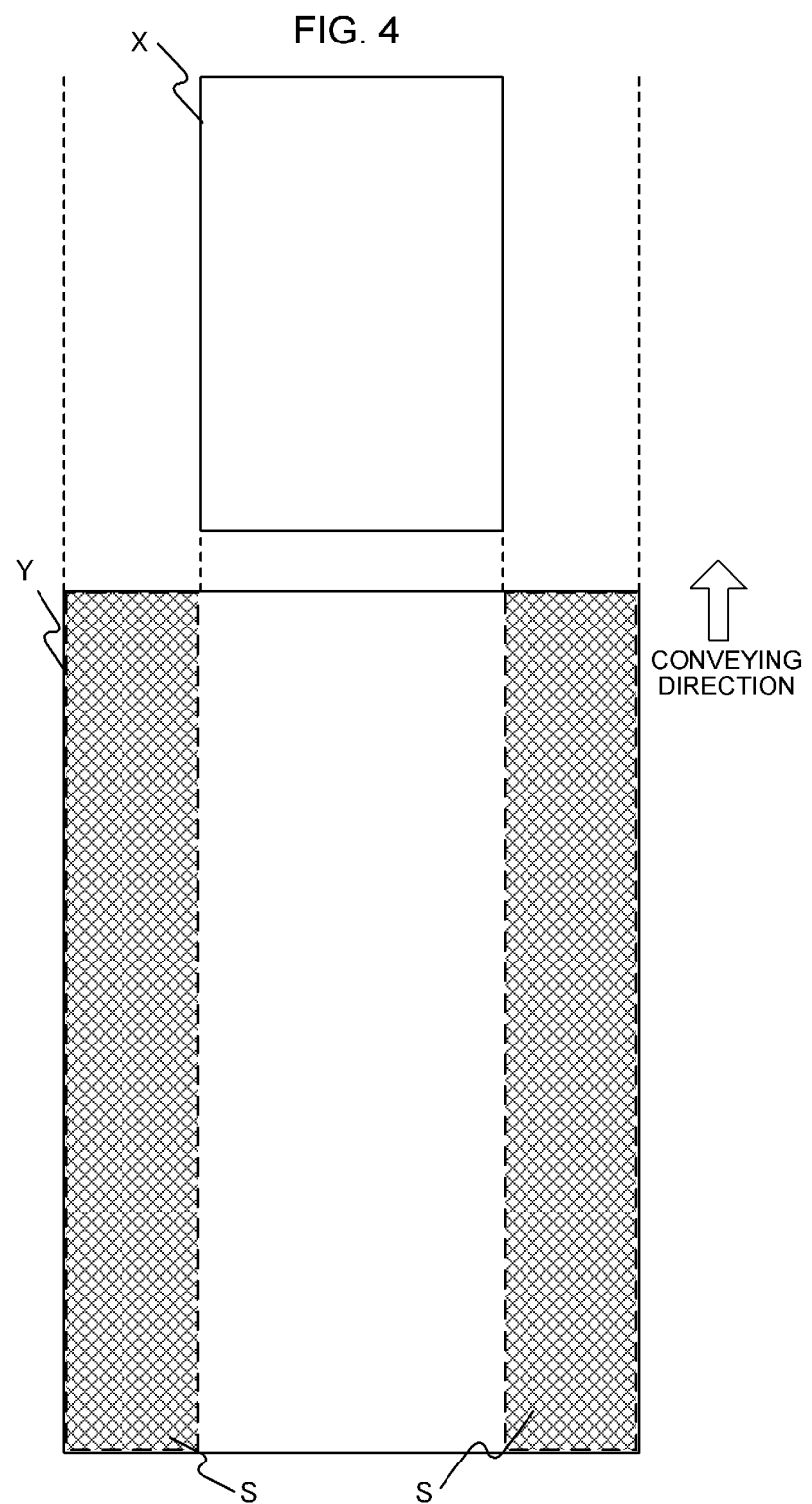

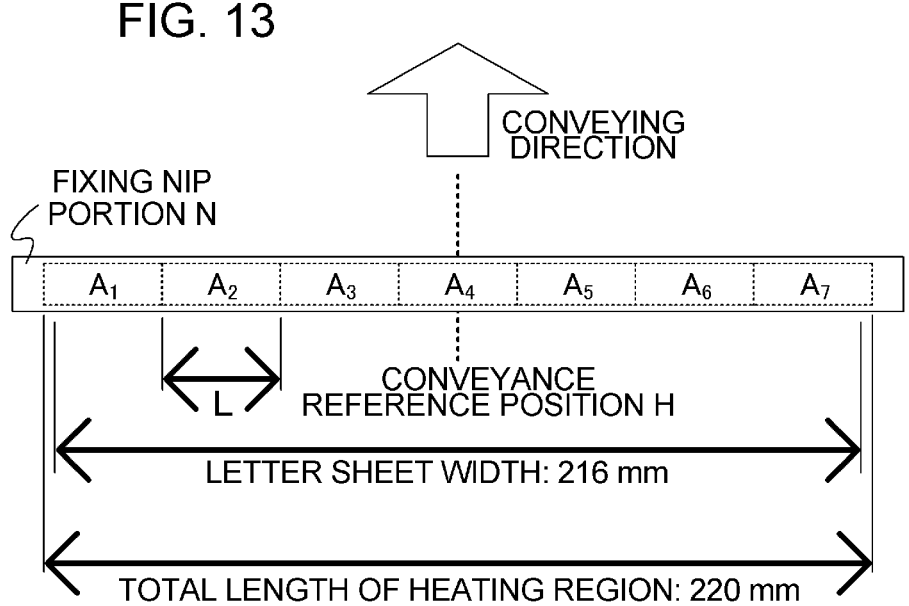

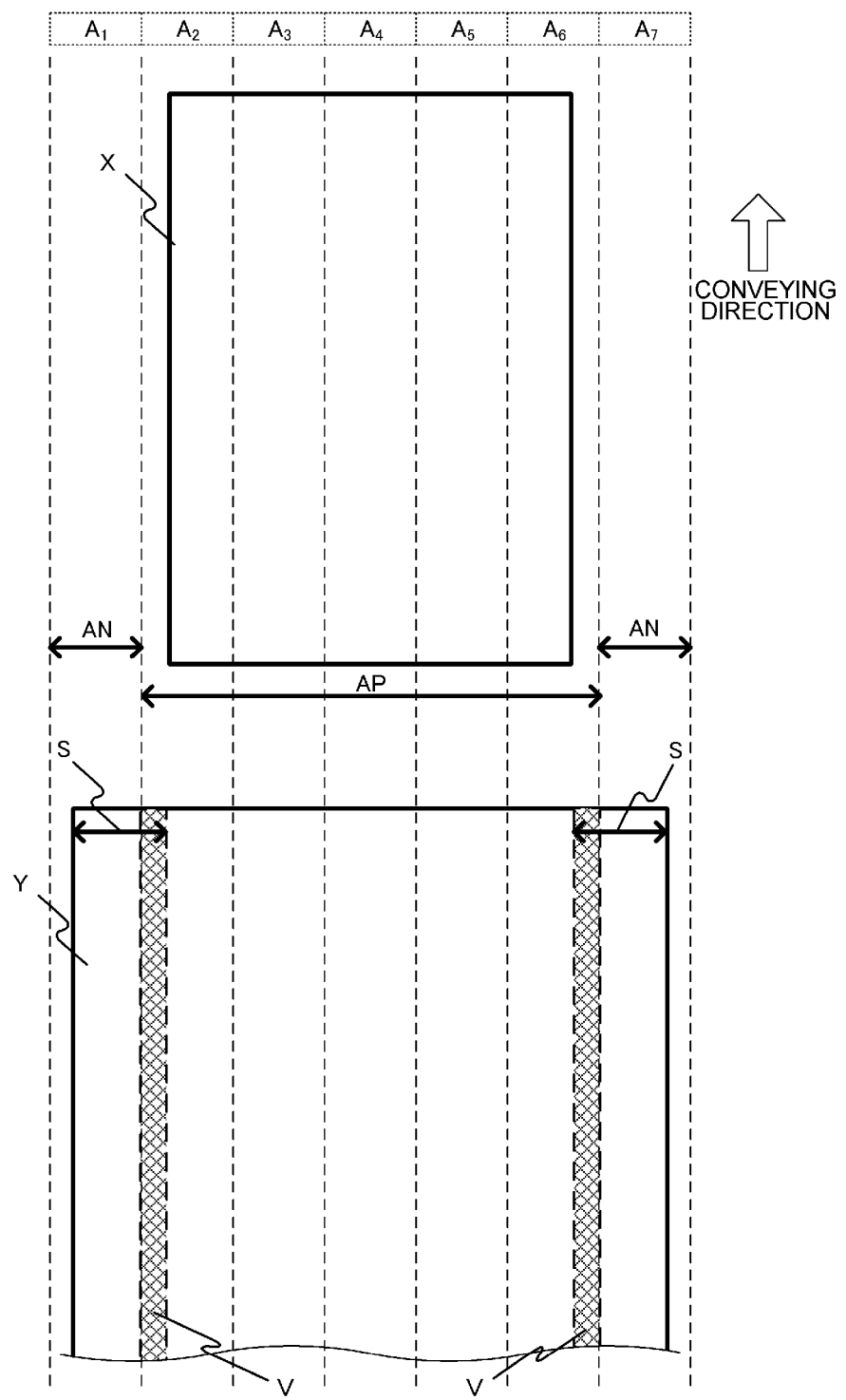

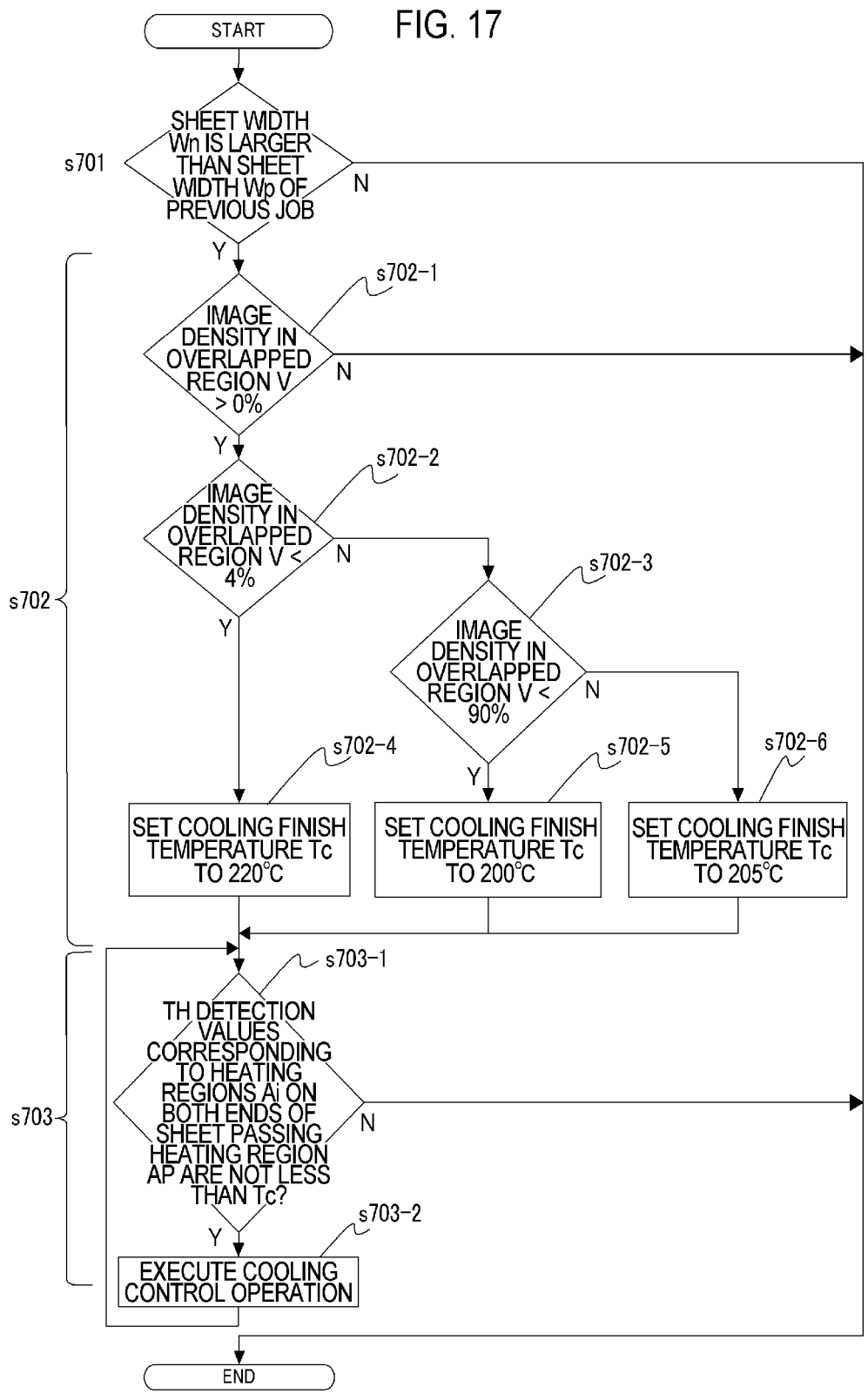

IMAGE FORMING APPARATUS

CROSS-REFERENCE TO RELATED APPLICATIONS

The present application is a Continuation of U.S. patent application Ser. No. 15/828,628, filed Dec. 1, 2017, which claims priority to Japanese Application No. 2016-236168, filed Dec. 5, 2016. Each of the forgoing applications is hereby incorporated by reference herein in its entirety.

BACKGROUND OF THE INVENTION

Field of the Invention

The present invention relates to an image forming apparatus, such as a copier and a printer, that forms a toner image on a recording material by using an electrophotographic system or an electrostatic recording system.

Description of the Related Art

An imaging forming apparatus based on the electrophotographic system or the electrostatic recording system includes a fixing unit to fix a toner image, which is formed on a recording material, onto the recording material. Generally the fixing unit is based on a thermal fixing system, in which a toner image is fixed onto the recording material using heat.

If the fixing processing is performed on a recording material having a narrow width (small-sized sheet) using a thermal fixing type fixing unit, the temperature of a region where the recording material does not pass in the fixing unit rises to excess (this phenomena is called a "temperature rise in a non-sheet-passing portion").

If an image is formed on a large-sized recording material immediately after such a temperature rise in a non-sheet-passing portion is generated, a toner image, formed in a region of the recording material which is in contact with the region of the fixing unit in which the temperature has risen to excess, is overly melted. If the toner image is overly melted, a toner offset to the fixing unit occurs, which contaminates the fixing unit, and drops the image quality of the toner image generated after the fixing processing. This image failure is called a "hot offset". A prior art to suppress this hot offset is that after small-sized recording materials are continuously passed, a processing to cool down the fixing unit is performed until the temperature of the non-sheet-passing region of the fixing unit drops, even if conveying a large-sized recording material is required. A next job cannot be processed during this processing.

Another method that is known as a prior art is that a blower fan is installed in the fixing apparatus, and air is blown onto the non-sheet-passing region of the fixing unit, whereby the temperature rise in the non-sheet-passing portion is forcibly dropped, as disclosed in Japanese Patent Application Publication No. 2003-076209. Another method that is known is that a large-sized dummy sheet is passed to cool down the fixing unit at a predetermined timing while small-sized recording materials are continuously passed, whereby the temperature rise in the non-sheet-passing portion is dropped, as disclosed in Japanese Patent Application Publication No. H08-234620.

However, in the case of the conventional image forming apparatuses, several seconds to several tens of seconds of cooling time (hereafter called "downtime") are required when an image is formed on the large-sized recording material after small-sized recording materials are passed. As a result, the next sheet cannot be passed during the down time, and productivity drops.

SUMMARY OF THE INVENTION

With the foregoing in view, it is an object of the present invention to suppress the drop in productivity which may occur when a larger-sized recording material is conveyed after the small-sized recording material is conveyed.

To achieve the above object, an image forming apparatus according to the present invention includes: an image forming portion that forms a toner image on a recording material; a fixing portion that fixes a toner image formed on a recording material onto the recording material by using heat; and a control portion that controls the apparatus, wherein when a toner image formed on a first recording material is fixed onto the first recording material by the fixing portion, and then an image is formed on a second recording material of which width is larger than that of the first recording material in the width direction of the recording material orthogonal to a conveying direction of the recording material, the control portion can execute a cooling sequence to cool a non-passing region of the fixing portion through which the second recording material passes but the first recording material does not pass, before the toner image formed on the second recording material is fixed by the fixing portion, and wherein the control portion sets an execution condition to execute the cooling sequence in accordance with information on the toner image in the region of the second recording material corresponding to the non-passing region.

To achieve the above object, an image forming apparatus according to the present invention includes: an image forming portion that forms a toner image on a recording material; a fixing portion that fixes a toner image formed on a recording material onto the recording material by using heat; and a control portion that controls the apparatus, wherein when a toner image formed on a first recording material is fixed onto the first recording material by the fixing portion, and then an image is formed on a second recording material of which width is larger than that of the first recording material in the width direction of the recording material orthogonal to a conveying direction of the recording material, the control portion can execute a cooling sequence to cool a non-passing region of the fixing portion through which the second recording material passes but the first recording material does not pass, before the toner image formed on the second recording material is fixed by the fixing portion; and wherein the control portion forms an image on the second recording material after the cooling sequence is executed in a case where there is a toner image on a region of the second recording material corresponding to the non-passing region, and forms an image on the second recording material without executing the cooling sequence in a case where there is no toner image on a region of the second recording material corresponding to the non-passing region.

Further features of the present invention will become apparent from the following description of exemplary embodiments (with reference to the attached drawings).

BRIEF DESCRIPTION OF THE DRAWINGS

FIG. 3A to FIG. 3C show configurations of a heater of Example 1 and positional relationships of temperature detecting portions;

FIG. 4 is a diagram depicting a narrow sheet X, a wide sheet Y and the positions of the non-sheet-passing regions S on the wide sheet Y;

FIG. 13 is a diagram depicting a heating region according to Example 3;

FIG. 16 is a diagram depicting a narrow sheet X, a wide sheet Y, and an overlapped region V on the wide sheet Y according to Example 3; and FIG. 17 is a flow chart depicting a cooling sequence for the non-sheet-passing portion according to Example 3.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Examples of the image forming apparatus to which the present invention can be applied are: a copier and a printer using an electrophotographic system or an electrostatic recording system; and a compound machine thereof. In this embodiment, a narrow sheet refers to a small-sized recording material (first recording material) P of which width in the direction orthogonal to the conveying direction of the recording material P (recording material width) is narrower than the maximum width of the recording material which the apparatus can convey, and a wide sheet refers to a recording material (second recording material) P of which width is wider than the narrow sheet. A non-sheet-passing region (non-passing region) S refers to a region where the narrow sheet does not pass, out of the region of the fixing portion where the wide sheet passes, in the direction orthogonal to the conveying direction of the recording material P. The longer side direction of a later mentioned heater 300 is the same as the direction orthogonal to the conveying direction of the recording material P.

Example 1

Example 1 will be described below.

Configuration of Image Forming Apparatus

Figure 1:
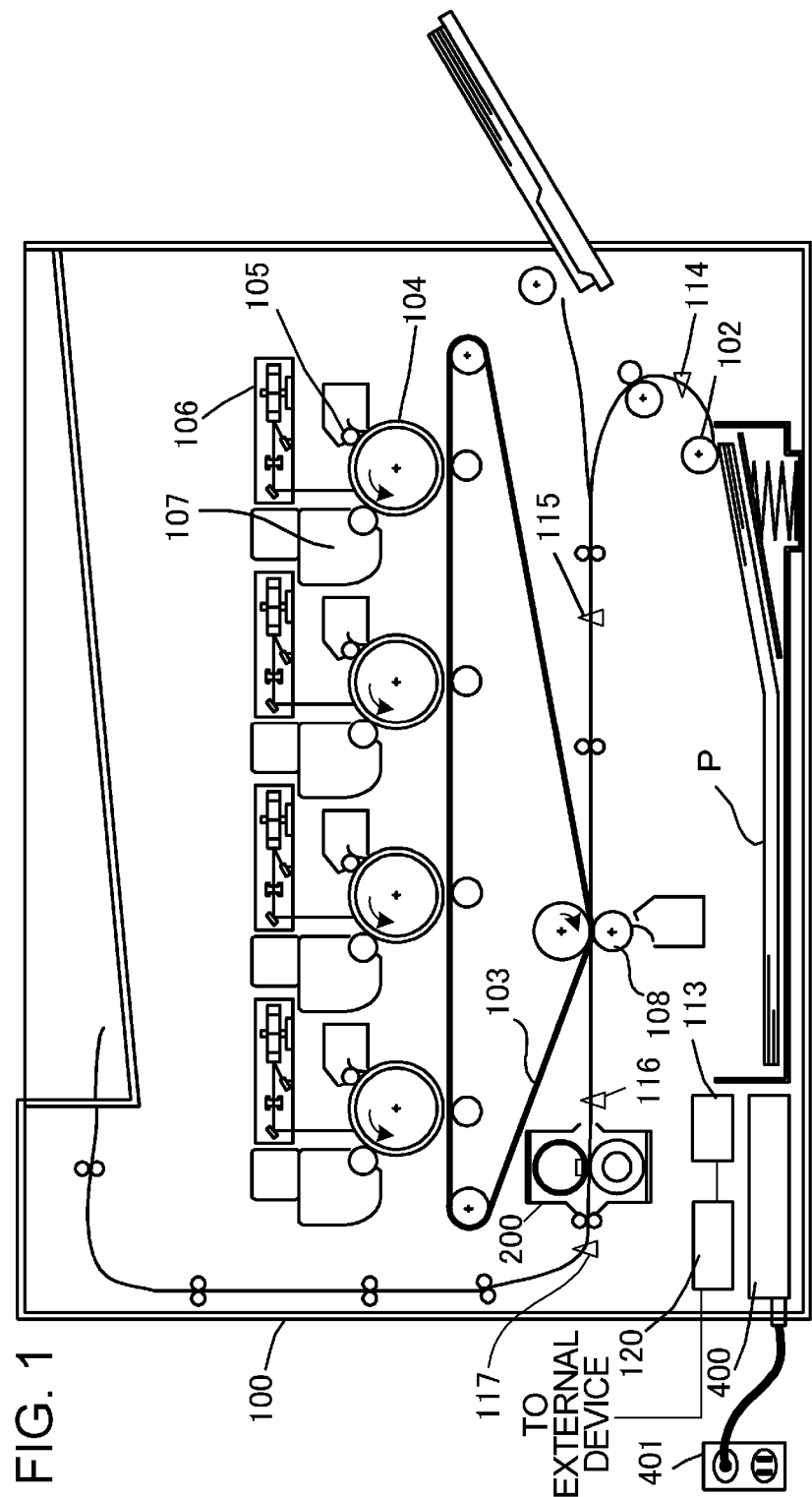
FIG. 1 is a cross-sectional view depicting a general configuration of an image forming apparatus according to Example 1.

FIG. 1 is a cross-sectional view depicting a general configuration of an image forming apparatus according to Example 1. The image forming apparatus 100 includes a video controller 120 and a control portion 113 which controls a cooling portion. The video controller 120 receives and processes image information sent from an external device, such as a personal computer, and a print job. The video controller 120 according to Example 1 can internally store the size information of a recording material on the print job. The control portion 113 is connected with the video controller 120, and controls each component of the image forming apparatus 100, responding to an instruction from the video controller 120. When the video controller 120 receives a print job from an external device, the image information is executed by the following operation.

The image forming apparatus 100 feeds a recording material P using a feeding roller 102, and conveys it to an intermediate transfer member 103. A photosensitive drum 104 is rotary-driven counterclockwise at a predetermined speed by the power of a driving source (not illustrated), and during this rotating step, the photosensitive drum 104 is uniformly charged by a primary charging device 105. A laser beam modulated depending on the image signal is outputted from a laser beam scanner 106, and selectively scans and exposes the surface of the photosensitive drum 104, whereby an electrostatic latent image is formed on the photosensitive drum 104. A developing device 107 attaches toner (developer) to the electrostatic latent image formed on the photosensitive drum 104, and visualizes the electrostatic latent image as a toner image (developer image). The toner image formed on the photosensitive drum 104 is primarily transferred onto the intermediate transfer member 103, which rotates while contacting the photosensitive drum 104. The photosensitive drum 104, the primary charging device 105, the laser beam scanner 106 and the developing device 107 are disposed for four colors: cyan (C), magenta (M), yellow (Y) and black (K) respectively. The four colors of toner images are sequentially superimposed and transferred onto the intermediate transfer member 103 by the same procedure.

In a secondary transfer portion constituted by the intermediate transfer member 103 and a transfer roller 108, the toner image transferred onto the intermediate transfer member 103 is secondarily transferred onto a recording material P by a transfer bias applied to the transfer roller 108. Then an image heating apparatus (fixing portion) 200, which fixes the secondarily transferred toner image onto the recording material P, performs a heating operation and a pressing operation to the recording material P, whereby the toner image is fixed and the recording material P is discharged from the apparatus as an image formed product.

The process speed of the image forming apparatus 100 according to Example 1 is 210 mm/s. The distance from the rear end of a previous recording material P, on which an image is formed, to the front end of a recording material P on which an image is formed next, in continuous printing where a plurality of pages of recording material are continuously printed, is 36 mm. For example, in the case of the continuous printing of letter-sized sheet, the throughput is 40 ppm (pages per minute).

The control portion 113 manages the conveyance state of the recording material P using a sheet width sensor 114, a resist sensor 115, a pre-fixing sensor 116, and a fixing discharge sensor 117 on a conveyance path of the recording material P. Additionally, the control portion 113 includes a storage portion, which stores a temperature control program of the image heating apparatus 200, and a temperature control table. A control circuit 400, which is a heater driving portion connected to a commercial AC power supply 401, supplies power to the image heating apparatus 200. The above mentioned photosensitive drum 104, primary charging device 105, laser beam scanner 106, developing device 107, intermediate transfer member 103 and transfer roller 108 constitute an image forming portion which forms an unfixed image on a recording material P.

Configuration of Image Heating Apparatus

Figure 2:
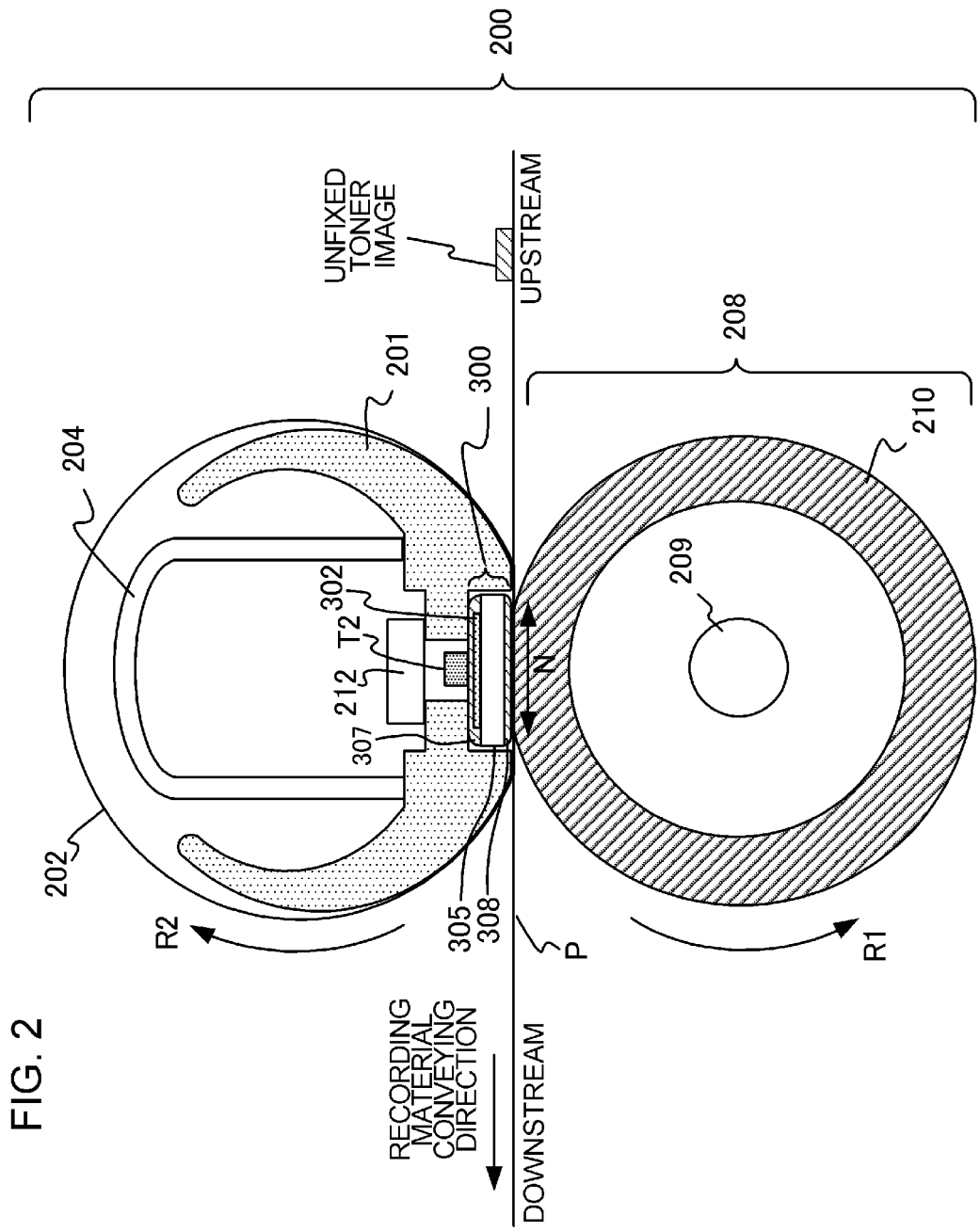
FIG. 2 is a schematic cross-sectional view depicting an image heating apparatus of Example 1.

FIG. 2 is a schematic cross-sectional view of the image heating apparatus 200 according to this example.

The image heating apparatus 200 includes a fixing film 202, a heater 300 which contacts the inner surface (inner peripheral surface) of the fixing film 202, a pressure roller 208 which, with the heater 300, forms a fixing nip portion N via the fixing film 202, and a metal stay 204. The fixing film 202 and the pressure roller 208 hold and convey the recording material P, on which an unfixed toner image is transferred, as a conveying portion, so as to fix the unfixed toner image to the recording material P by the heat from the heater 300, and by the pressure applied to the fixing nip portion N via a spring (not illustrated). The fixing film 202 is a tubular multilayer heat resistant film constituted by a base layer, an elastic layer and a surface layer. The base layer is formed of a heat resistant resin (e.g. polyimide) or a metal (e.g. stainless) of which thickness is about 20 to 100 μm. The elastic layer is formed by a heat resistant silicon rubber of which thickness is about 100 to 400 μm. The surface layer is formed of a heat resistant resin having excellent release characteristics (e.g. tetrafluoroethylene-perfluoro alkyl vinyl ether copolymer (PFA)), of which thickness is about 10 to 50 μm. The pressure roller 208 includes a core metal 209 made of such material as iron or aluminum, and an elastic layer 210 made of such material as silicon rubber.

The heater 300 is held in a heater holding member 201 made of heat resistant resin, and heats the fixing film 202. The heater holding member 201 also has a guide function to guide the rotation of the fixing film 202. The metal stay 204 receives an applied pressure (not illustrated), and energizes the heater holding member 201 toward the pressure roller 208. The pressure roller 208 receives power from a driving source and rotates in the arrow R1 direction. By the rotation of the pressure roller 208, the fixing film 202 is driven in the arrow R2 direction. While the recording material P is held and conveyed by the fixing nip portion N, the heat of the fixing film 202 is transferred to the recording material P (the unfixed toner image on the recording material P is heated by the heater 300 via the fixing film 202), whereby the unfixed toner image on the recording material P is fixed.

The image heating apparatus 200 includes temperature detecting portions T1, T2 and T3 which detect the temperature of the heater 300. The temperature detecting portion T2 is a temperature detecting portion to detect the temperature of the center region of the heater 300 in the longer side direction. The temperature detecting portions T1 and T3 are temperature detecting portions to detect the temperature of the edge regions of the heater 300 in the longer side direction.

A configuration of the heater 300 according to this example and the positional relationship of the temperature detecting portions T1, T2 and T3 will be described with reference to FIG. 3A to FIG. 3C.

FIG. 3A is a cross-sectional view depicting a neighborhood of the heater 300 in the image heating apparatus 200, FIG. 3B is a plan view depicting a back surface of a substrate 305 of the heater 300, and FIG. 3C is a plan view depicting the back surface of the heater 300 and the positional relationship of the temperature detecting portions T1, T2 and T3 which are in contact with the back surface. In FIG. 3B and FIG. 3C, a conveyance reference position H of the recording material P in the image forming apparatus 100 of this example is indicated. In this example, the conveyance reference is the center, and the recording material P is conveyed such that the center of the recording material in the direction orthogonal to the recording material conveying direction (longer side direction of the heater 300) moves along the conveyance reference position H, which is the center of the recording material conveyance path. In this example, the temperature detecting portions T1 and T3 are located near the edges of the heater 300 in the longer side direction, which are positions 102.5 mm from the conveyance reference position H respectively in the longer side direction. The temperature detecting portions T1 and T3 disposed like this detect the temperature of the heater 300 in the later mentioned non-sheet-passing region. In this example, the maximum sheet-passing width of the recording material P in the image forming apparatus 100 is 216 mm. Instead of detecting the temperature of the heater 300, the temperature detecting portions T1, T2 and T3 may detect the temperature of the surface of the fixing film 202, or the pressure roller 208.

The heater 300 includes a heat generating element 302, which is disposed on the ceramic substrate 305, and generates heat when electricity is turned ON. The heater 300 is disposed so as to contact the inner peripheral surface of the fixing film 202, and heats the fixing film 202. A surface protection layer 308, which contacts with the inner peripheral surface of the fixing film 202 at the fixing nip portion N, is disposed on the heater 300, and a surface protection layer 307, which protects the substrate 305 and the heat generating element 302 on the substrate 305, is disposed on the back surface of the heater 300. Further, as illustrated in FIG. 3B, electric contacts E-a and E-b are disposed on both ends in the longer side direction on the back surface of the heater 300. A control circuit 400, which functions as the heater driving portion, connected to a commercial AC power supply 401, is electrically connected with the electric contacts E-a and E-b of the heater 300, and supplies power to the heat generating element 302 of the heater 300. Furthermore, a safety element 212, such as a thermo switch and a temperature fuse, which activates when abnormal heating occurs to the heater 300 and shuts the power supply to the heater 300 OFF, is connected to the heater 300 directly or indirectly via the heater holding member 201.

Cooling Sequence of Non-Sheet-Passing Portion

This example is characterized in that when a wide sheet is passed after a narrow sheet has passed, the control portion 113 sets an execution condition for a cooling control portion (cooling portion) to cool the non-sheet-passing region S, depending on the image information of the image formed in the non-sheet-passing regions S of the region of the wide sheet. In this example, a case of controlling the temperature to finish the cooling for the non-sheet-passing region S (hereafter called "cooling finish temperature Tc"), depending on the above image information, will be described. Here the cooling finish temperature Tc corresponds to the execution temperature, which is a threshold to determine whether the cooling operation is executed for the non-sheet-passing region S.

Figure 5:
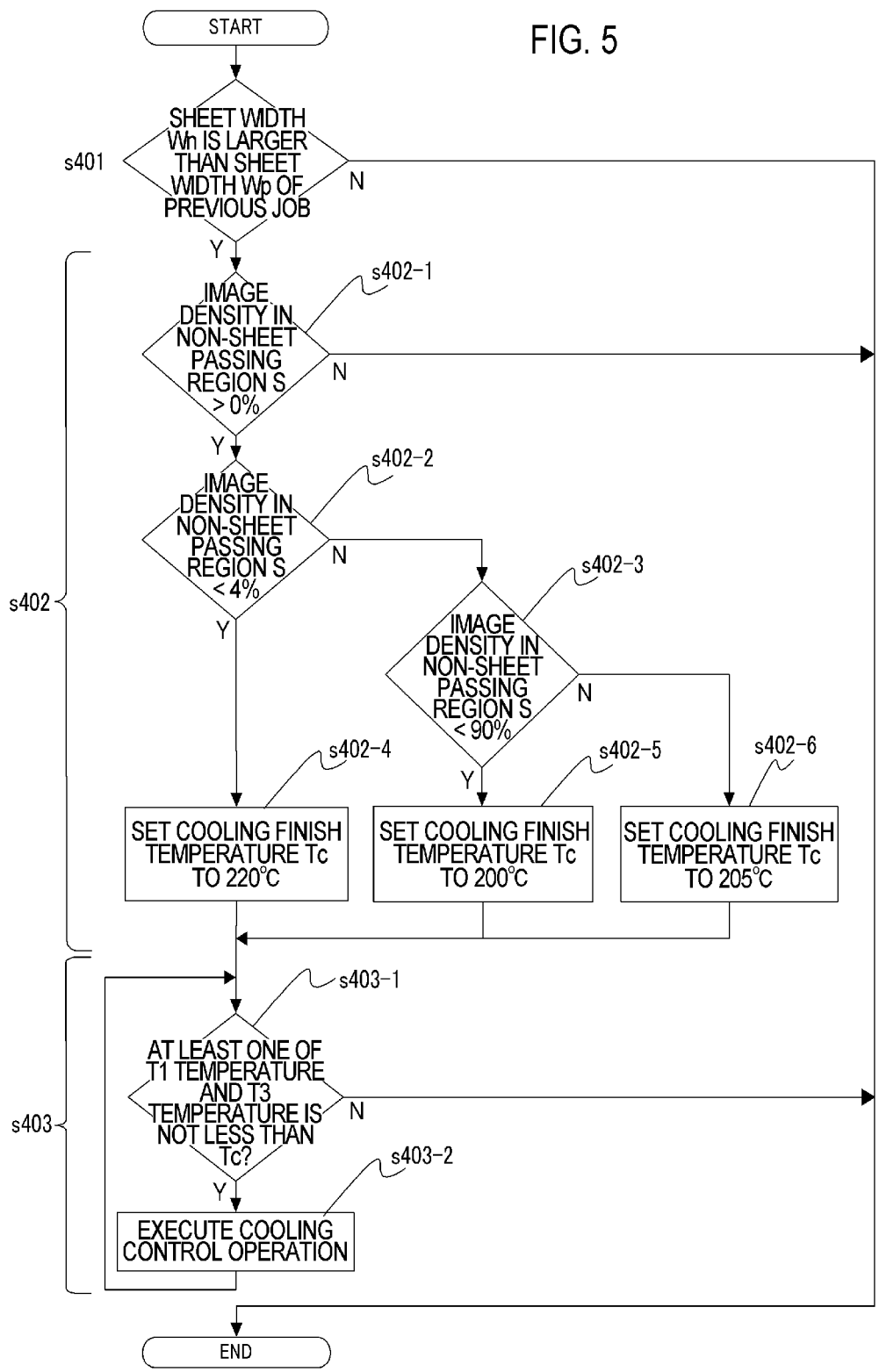
FIG. 5 is a flow chart depicting a cooling sequence of the non-sheet-passing portion according to Example 1.

FIG. 4 is a diagram depicting a narrow sheet X which was passed in the previous print job, a wide sheet Y which is printed in the next print job, and a position of the non-sheet-passing region S on the wide sheet Y. FIG. 5 is a flow chart depicting the cooling sequence for the non-sheet-passing portion according to this example.

The cooling sequence for the non-sheet-passing portion includes a sheet width comparison sequence s401, a condition adjustment sequence s402 to adjust the condition to execute the cooling for the non-sheet-passing portion (hereafter called "cooling execution condition"), and an execution sequence (cooling sequence) s403 to execute the cooling operation by the cooling control portion. In the sheet width comparison sequence s401, the control portion 113 compares the sheet width Wn of a recording material P which is passed in the next print job, and the sheet width Wp of a recording material P which was passed in the previous print job, based on the image information received by the video controller 120. If the sheet width Wn of the recording material P which is passed next is narrower than the sheet width Wp of the recording material P which was passed previously, the cooling sequence for the non-sheet-passing portion finishes, and the next printing is executed without cooling the non-sheet-passing portion. If the sheet width Wn of the recording material P which is passed next is wider than the sheet width Wp of the recording material P which was passed previously, the condition adjustment sequence s402, to adjust the cooling execution condition, is executed based on the image information on the recording material P which is passed in the current print job.

The image information that is used in the condition adjustment sequence s402 will be described next. A number of pixels of the image forming apparatus according to this example is 600 dpi, and the video controller 120 creates bit map data (image density data of each CMYK color) in accordance with this number of pixels. In the image forming apparatus of this example, the video controller 120 calculates the image density by integrating the image density data of each color for each dot of the bit map data.

A method of changing the cooling execution condition with respect to the image density calculated in the condition adjustment sequence s402 will be described in detail with reference to Table 1.

In the condition adjustment sequence s402, the set value of the cooling finish temperature Tc is changed depending on the image density in the non-sheet-passing region S.

When the image density in the non-sheet-passing region S is 0%, that is, when an image does not exist in the non-sheet-passing region S, the cooling sequence for the non-sheet-passing portion finishes, and the next printing is executed without cooling the non-sheet-passing portion (s402-1). When the image density in the non-sheet-passing region S is more than 0% and less than 4% (less than the first image density), the cooling finish temperature Tc is set to 220° C. (s402-2, s402-4). When the image density in the non-sheet-passing region S is at least 4% (at least first image density) and less than 90% (less than second image density), the cooling finish temperature Tc is set to 200° C. (s402-3, s402-5). When the image density in the non-sheet-passing region S is at least 90% (at least second image density), the cooling finish temperature Tc is set to 205° C. (s402-3, s402-6).

After the condition adjustment sequence s402, the execution sequence s403 is executed. In the execution sequence s403, it is checked whether the detected values by the temperature detecting portions T1 and T3 are at least the cooling finish temperature Tc (s403-1). If both of the detected values by the temperature detecting portions T1 and T3 are less than the cooling finish temperature Tc, the cooling sequence for the non-sheet-passing portion finishes in the execution sequence s403, and the next printing is executed. If the detected values by the temperature detecting portions T1 and T3 are at least the cooling finish temperature Tc (at least execution temperature), the cooling control portion executes the cooling operation (s403-2). s403-1 and s403-2 are repeated and the cooling operation by the cooling control portion continues until both of the detected values by the temperature detecting portions T1 and T3 become less than the cooling finish temperature Tc.

In this example, a method of driving the pressure roller 208 and cooling the fixing film 202 and the pressure roller 208 by radiation was used as the cooling control operation (cooling sequence). The cooling control operation may cool the fixing film 202 and the pressure roller 208 by radiation in the stopped state. An air ventilation portion, such as a fan, to blow air into a region which includes at least the non-sheet-passing region S in the fixing film 202 and the pressure roller 208 for radiation cooling, or an exhaust portion, may be disposed. At this time, the air blowing portion and the exhaust portion are disposed preferably near the fixing film 202 and the pressure roller 208. A cooling member, such as a metal roller, may be contacted with either one or both of the fixing film 202 and the pressure roller 208.

TABLE 1

Cooling execution condition with respect to image density

| | Image information of non-sheet-passing region S | | | |
|---|---|---|---|---|
| | Image density 0% | Image density more than 0% and less than 4% | Image density at least 4% and less than 90% | Image density at least 90% |
| Cooling execution condition | Cooling control for non-sheet-passing portion is not executed | Detected temperatures of T1 and T3 are at least 220° C. | Detected temperatures of T1 and T3 are at least 200° C. | Detected temperatures of T1 and T3 are at least 205° C. |

Effects of this Example

The effects of this example were confirmed by comparing this example with an image forming apparatus of a comparative example.

The comparative example will be described first. It is assumed that the configurations of the image forming apparatus and the image heating apparatus of the comparative example are the same as those of this example. The differences of the comparative example from this example are that: the condition adjustment sequence is not performed in the cooling sequence for the non-sheet-passing portion; and the cooling finish temperature Tc is fixed to 200° C.

Figure 6:
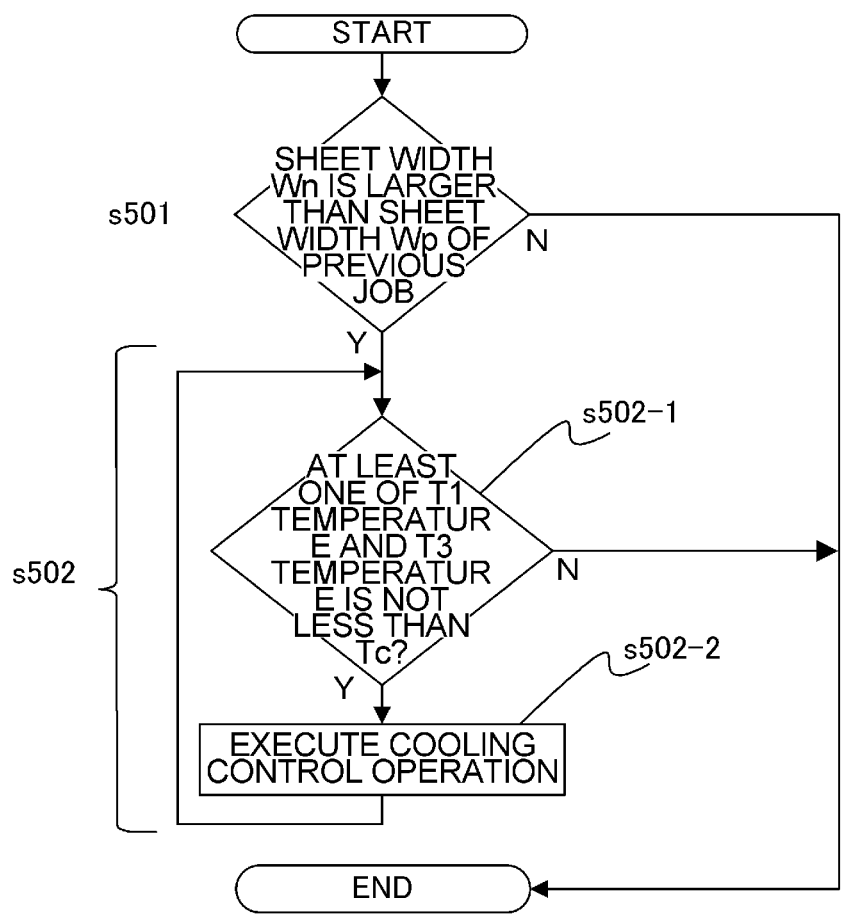
FIG. 6 a flow chart depicting a cooling sequence of the non-sheet-passing portion according to a comparative example.

FIG. 6 is a flow chart depicting the cooling sequence for the non-sheet-passing portion according to the comparative example. The cooling sequence for the non-sheet-passing portion according to the comparative example includes a comparison sequence s501 using sheet having the same sheet width as this example. In the cooling sequence of the non-sheet-passing portion in the comparative example, the execution sequence s502 is executed after the sheet width comparison sequence s501. In the execution sequence s502, the cooling operation is executed when the detected values by the temperature detecting portions T1 and T3 are at least the cooling finish temperature Tc (200° C.), just like this example (s502-1, s502-2).

To confirm the effects of the image forming apparatus of this example, a comparative test was performed using the image forming apparatus of the comparative example and the image forming apparatus of this example. The content of the comparative test follows. The comparative test was performed under a 23° C. temperature and a 50% humidity environment. The image forming apparatus was left idle for two hours during which no printing was executed, then the test was performed.

As a narrow sheet X, 100 pages of standard sheet (made by Canon Inc., GF-0081, 81.4 g/m$^2$) B5 size (182 mm×257 mm) are printed on one side. Continuing after this print job, as a wide sheet Y, one page of standard sheet (made by HP Inc., Laserjet, 90 g/m$^2$) in LTR (letter) size (215.9 mm×279.4 mm) is printed on one side. For the printed image, a single color uniform black image having a predetermined image density is set for the entire surface, including the non-sheet-passing region S. For the predetermined image densities, 0%, 3%, 50% and 100% are set.

Now the relationship between the image density and the temperature region, in which a hot offset is generated, will be described with reference to FIG. 7. The abscissa indicates the image density of the uniform image in the non-sheet-passing region S, and the ordinate indicates the temperature detected by the temperature detecting portions T1 and T3.

Figure 7:
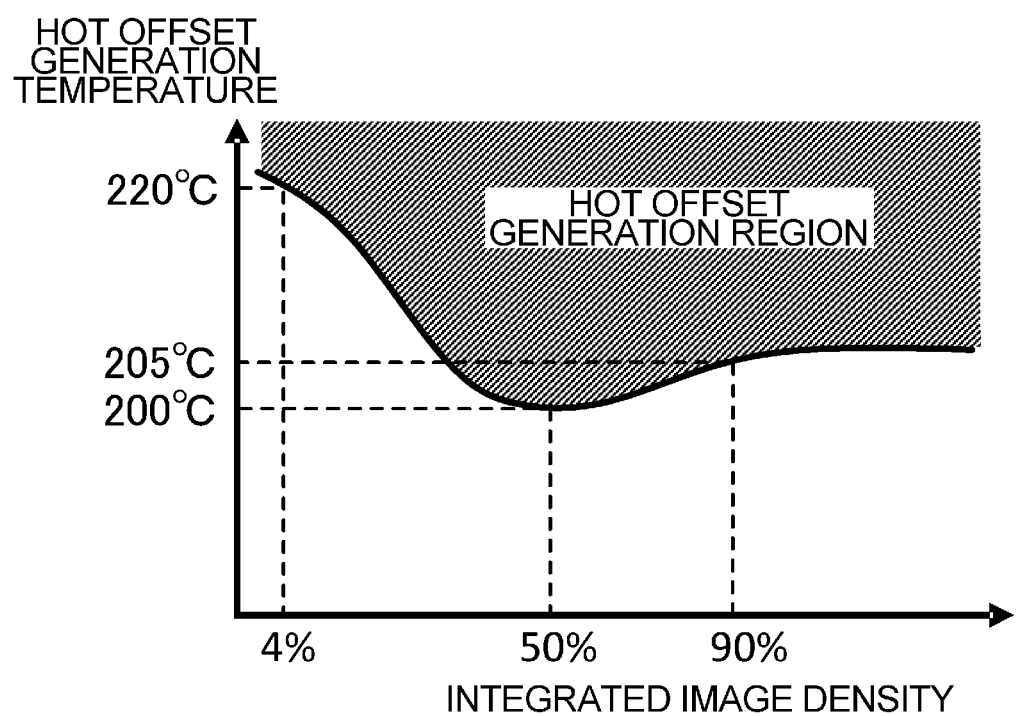
FIG. 7 is a diagram depicting a relationship between an image density and a temperature region where the hot offset is generated.

As depicted in FIG. 7, when the image density is at least 90%, the binding force among toner particles is high, therefore a hot offset is not generated if the detected temperature by the temperature detecting portion is not more than 205° C. If the image density decreases from 90%, isolated toner particles existing on the sheet increase, therefore the offset of the toner image increases, and hot offset is more easily generated. In order to prevent the generation of a hot offset when the image density is decreased from 90% to an image density close to 50%, as depicted in FIG. 7, the non-sheet-passing portion must be cooled down so that the detected temperature by the temperature detecting portion becomes not more than 200° C. In the comparative example, the cooling finish temperature Tc is set to 200° C., in order to prevent the generation of a hot offset under any conditions. If the image density is further decreased from 50% and enters the low density region, the density of the toner image itself decreases as well, hence the density of the toner image that is offset on the fixing film 202 also decreases. As a result, the hot offset is not visually recognized very clearly, therefore the cooling finish temperature can be set high.

In this example, the time period of execution of the cooling sequence for the non-sheet-passing portion, which is executed before a job to print a uniform image having a predetermined image density on wide sheet, is measured and compared with the comparative example.

Figure 8:
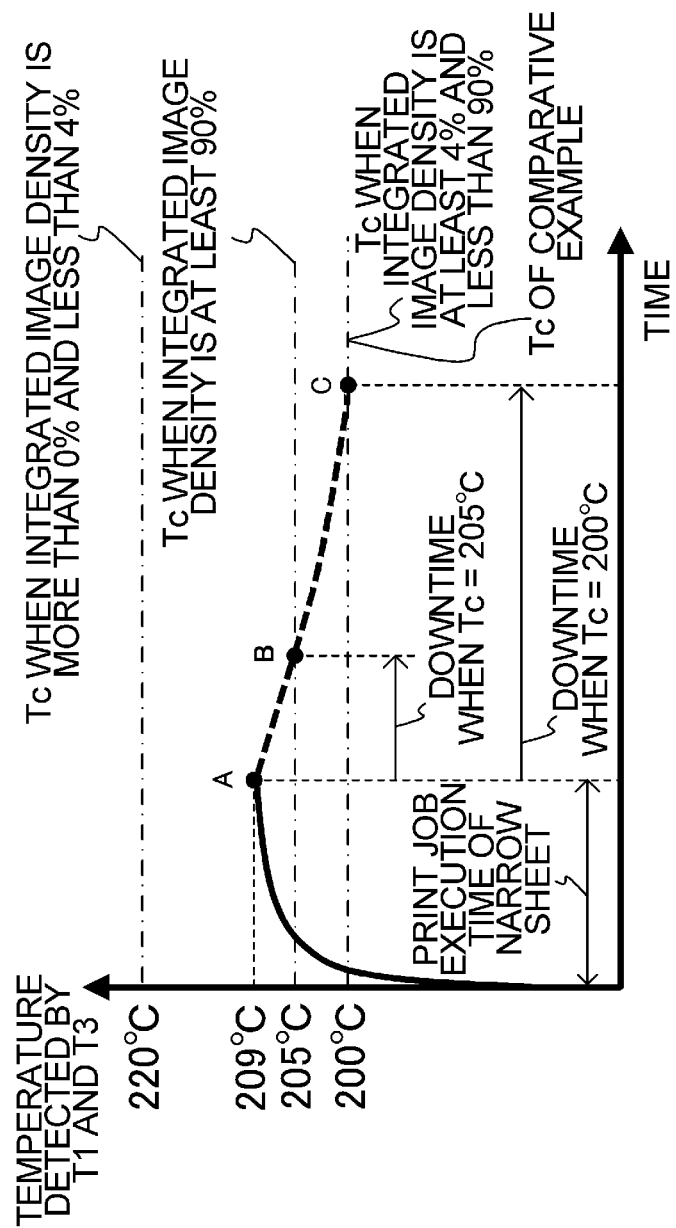
FIG. 8 is a diagram depicting a temporal transition of the detected value by a temperature detecting portion in the comparative test according to Example 1.

FIG. 8 is a diagram depicting a temporal transition of detected values by the temperature detecting portions T1 and T3 in the comparative test. The relationship between the detected values and the hot offset generation temperature depicted in FIG. 7 will be described with reference to FIG. 8.

The solid line in FIG. 8 indicates the temperature transition when the narrow sheet is being printed. The broken line connecting A to C in FIG. 8 indicates the temperature transition when the execution sequence is executed. A in FIG. 8 indicates that the detected values by the temperature detecting portions T1 and T3 are 209° C. at the finish of the narrow sheet printing.

In this example, the cooling finish temperature Tc in not set when the image density is 0%. Hence the next print job is executed at the point A in FIG. 8. In this example, the cooling finish temperature Tc is set to 220° C. when the image density is more than 0% and less than 4%, hence the next print job is executed at the point A in FIG. 8. In this example, the cooling finish temperature Tc is set to 205° C. when the image density is at least 90%, hence the next print job is executed at the point B in FIG. 8. In this case, the time from A to B is the time period of execution of the cooling sequence for the non-sheet-passing portion. In the case when the image density is at last 4% and less than 90% in this example, and in the case of the comparative example, the cooling finish temperature Tc is set to 200° C., hence the next print job is executed at the point C in FIG. 8. In this case, the time from A to C is the time period of execution of the cooling sequence for the non-sheet-passing portion.

Table 2 shows the set value of the cooling finish temperature Tc and the result of measuring the time period of execution of the cooling sequence for the non-sheet-passing portion before executing the print job using wide sheet, with respect to each image density.

TABLE 2

Time period of execution of cooling sequence for non-sheet-passing portion

| | This example | | Comparative example | |
|---|---|---|---|---|
| Image density in printing region for wide sheet | Cooling finish temperature Tc | Time period of execution of cooling sequence for non-sheet-passing portion | Cooling finish temperature Tc | Time period of execution of cooling sequence for non-sheet-passing portion |
| 0% | — | 0 sec | 200° C. | 12 sec |
| 3% | 220° C. | 0 sec | | |
| 50% | 200° C. | 12 sec | | |
| 100% | 205° C. | 4 sec | | |

As Table 2 shows, according to the image forming apparatus of this example, the time period of execution of the cooling sequence for the non-sheet-passing portion can be decreased compared to the comparative example, and a drop in productivity can be suppressed. In other words, when the image density is 0%, that is, when no image exists in the non-sheet-passing region S, and when the image density is more than 0% and less than 4%, the next printing can be executed without downtime. Further, when the image density is at least 90%, the downtime can be decreased considerably in the image forming apparatus of this example, compared with the comparative example. In both this example and the comparative example, the hot offset of the passed wide sheet is at a visually unrecognizable level.

This example was described using the relationship of the cooling finish temperature with respect to the four image density ranges, but the present invention is not limited to this condition, and any condition setting considering the hot offset can be used.

Example 2

Example 2 will be described below.

In this example, the cooling time to perform the cooling operation using the cooling control portion is controlled based on the image information of the wide sheet, whereby the downtime is decreased. In Example 2, the redundant content of Example 1 will be omitted, and the same composing element or portion as Example 1 is described using the same reference sign.

Cooling Sequence of Non-Paper Passing Section

Figure 9:
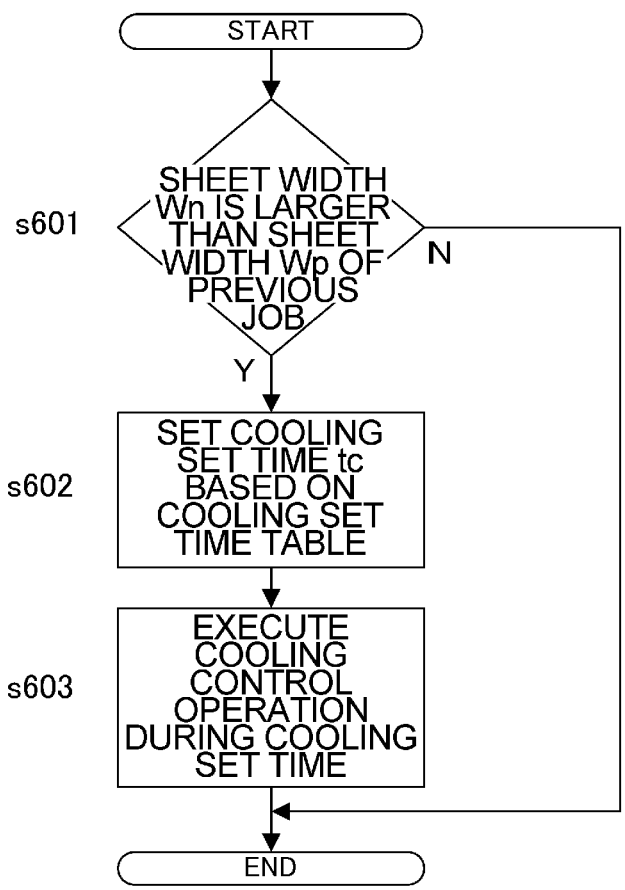
FIG. 9 is a flow chart depicting a control of a cooling sequence for the non-sheet-passing portion according to Example 2.

FIG. 9 is a flow chart depicting control of the cooling sequence for the non-sheet-passing portion according to this example.

The cooling sequence for the non-sheet-passing portion according to this example includes a sheet width comparison sequence s601, a time adjustment sequence s602 to adjust the time period of execution of cooling of the non-sheet-passing portion, and an execution sequence s603. The sheet widths comparison sequence s601 according to this example is the same as the sheet width comparison sequence s401 according to Example 1.

If the sheet width Wn of the recording material P which is passed next is wider than the sheet width Wp of the recording material P which was passed previously, the time adjustment sequence s602 is executed. If the sheet width Wn of the recording material P which is passed next is narrower than the sheet width Wp of the recording material P which was passed previously, the cooling sequence for the non-sheet-passing portion finishes, and printing is executed without cooling the non-sheet-passing portion.

In the time adjustment sequence s602, the cooling control portion sets the cooling time tc to execute the cooling operation using a cooling time table, based on a number of pages of the narrow sheet which were continuously passed in the previous print job and the image density of the non-sheet-passing region S of the wide sheet.

Table 3 shows the relationship between the image density of the non-sheet-passing region S and the cooling time tc, that is, a cooling time table. It is preferable that this cooling time table is set and stored in the control portion 113 in advance.

TABLE 3

Cooling time table

| | | Image information of non-sheet-passing region S | | | |
|---|---|---|---|---|---|
| | Cooling time tc [sec] | Image density 0% | Image density more than 0% and less than 4% | Image density at least 4% and less than 90% | Image densify at least 90% |
| Number of passed pages of narrow sheet | 1-50 pages | tc = 0 | tc = 5 | tc = 5 | tc = 5 |
| | 51-100 pages | | tc = 5 | tc = 15 | tc = 10 |
| | 101-200 pages | | tc = 5 | tc = 25 | tc = 20 |
| | 201- pages | | tc = 10 | tc = 30 | tc = 30 |

In the time adjustment sequence s602, the cooling time tc is set as follows, based on the cooling time table. In other words, when the image density in the non-sheet-passing region S is 0%, that is, when no image exists in the non-sheet-passing region S, the cooling time tc is set to 0 seconds, regardless the number of pages of the narrow sheet that are passed.

When the image density in the non-sheet-passing region S is more than 0% and less than 4%, the cooling time tc is set to the same or smaller value than the case when the image density in the non-sheet-passing region S is at least 4%. When the image density in the non-sheet-passing region S is at least 4% and less than 90%, the cooling time tc is set to each value shown in Table 3, depending on the number of pages of sheet that is passed. When the image density in the non-sheet-passing region S is at least 90%, the cooling time tc is set to the same as or a smaller value than the case when the image density in the non-sheet-passing portion is at least 4% and less than 90%.

In the time adjustment sequence s602, the cooling time tc is set, then the execution sequence s603 is executed. In the execution sequence s603 according to this example, the cooling control portion executes the cooling operation during the cooling time tc. The cooling control portion according to this example drives the pressure roller 208 during idle, rotates the fixing film 202 and the pressure roller 208, and performs the cooling operation by the radiation cooling just like Example 1. During the cooling time tc, the cooling control portion executes the cooling operation, then finishes the cooling sequence for the non-sheet-passing portion, and starts printing of the wide sheet.

Effects of this Example

The effects of this example were confirmed by comparing this example with an image forming apparatus of a comparative example.

The comparative example will be described first. It is assumed that the configurations of the image forming apparatus and the image heating apparatus of the comparative example are the same as those of this example, and the configuration of the cooling sequence for the non-sheet-passing portion is also the same as that of this example. A difference of the comparative example from this example is the cooling time table.

Table 4 shows the relationship between the image density in the non-sheet-passing region S and the cooling time tc according to the comparative example. The cooling time table according to the comparative example is configured so as to set the cooling time tc based only on the number of pages of the narrow sheet which passed in the previous print job.

TABLE 4

Cooling time table according to comparative example

| | | Cooling time tc [sec] |
|---|---|---|
| Number of passed pages of narrow sheet | 1-50 pages | tc = 5 |
| | 51-100 pages | tc = 15 |
| | 101-200 pages | tc = 25 |
| | 201- pages | tc = 30 |

To confirm the effects of the image forming apparatus of this example, a comparative test was performed using the image forming apparatus of the comparative example and the image forming apparatus of this example. The content of the comparative text is the same as the comparative test described in Example 1.

Figure 10:
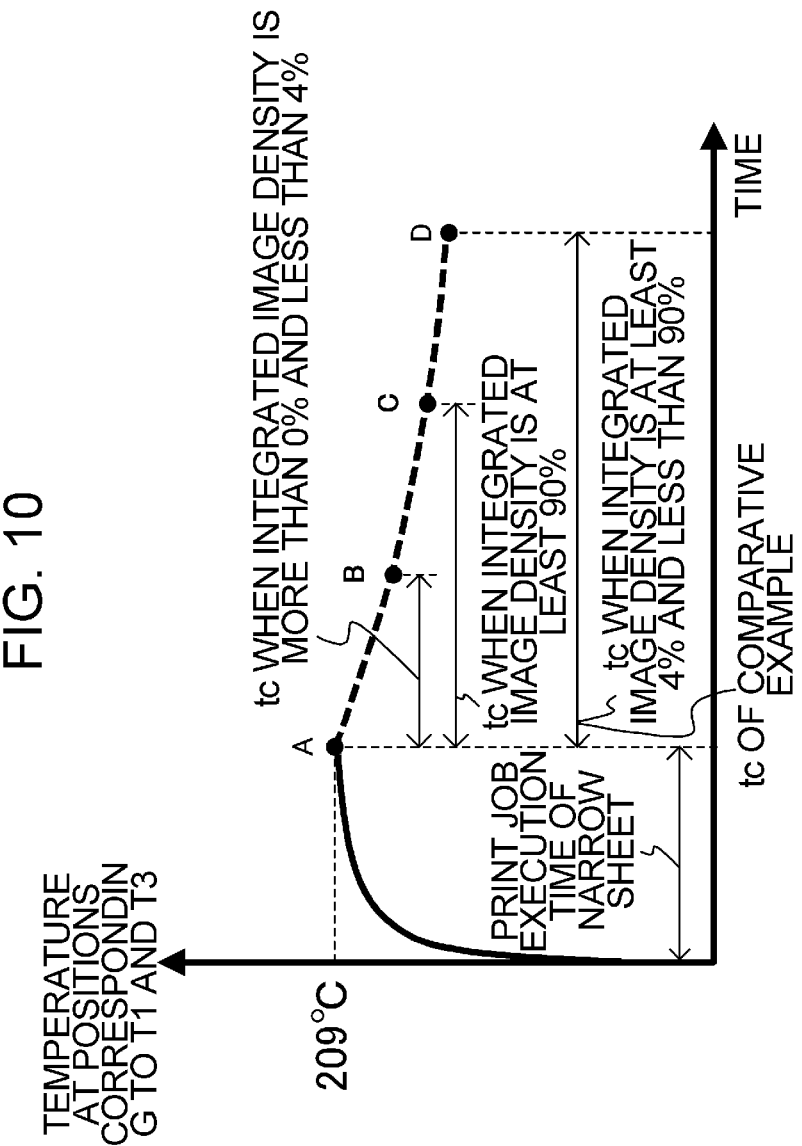
FIG. 10 is a diagram depicting a temporal transition of the temperature at a position corresponding to the temperature detecting portion in the comparative test according to Example 2.

FIG. 10 is a diagram depicting the temporal transition of the temperature at the positions corresponding to the temperature detecting portions T1 and T3 in the comparative test. The cooling time tc for each image density will be described with reference to FIG. 10.

The solid line in FIG. 10 indicates the temperature transition while the narrow sheet is being printed. The broken line connecting A to D in FIG. 10 indicates the temperature transition when the execution sequence is executed. In this example, when the image density is 0%, the cooling time tc is set to 0 seconds. Hence the next print job is executed at the point A in FIG. 10. In this example, the cooling time tc is set to 5 seconds when the image density is more than 0% and less than 4%, hence the next print job is executed at the point B in FIG. 10. In this example, the cooling time tc is set to 10 seconds when the image density is at least 90%, hence the next print job is executed at the point C in FIG. 10. In the case when the image density is at least 4% and less than 90% in this example and in the case of the comparative example, the cooling time tc is set to 15 seconds, hence the next print job is executed at the point D in FIG. 10.

Table 5 shows the result of measuring the time period of execution of the cooling sequence for the non-sheet-passing portion before executing the print job using wide sheet.

TABLE 5

| | Time period of execution of cooling sequence for non-sheet-passing portion | |
|---|---|---|
| Image density in printing region of wide sheet | This example | Comparative example |
| 0% | 0 sec | 15 sec |
| 3% | 5 sec | |
| 50% | 15 sec | |
| 100% | 10 sec | |

As Table 5 shows, in the number of pages of the narrow sheet printed in the comparative test and image pattern thereof, the time period of execution of the cooling sequence for the non-sheet-passing portion can be decreased, and a drop in productivity can be suppressed, if the image forming apparatus of this example is used, compared with the comparative example. In other words, when the image density is 0% (that is, no image exists in the non-sheet-passing region S), the next print job can be executed without downtime. Further, when the image density is more than 0% and less than 4%, and when the image density is at least 90%, the downtime can be decreased considerably in the image forming apparatus of this example, compared with the comparative example. Unlike Example 1, the image forming apparatus of Example 2 does not use the temperature detecting portions T1 and T3 to control the cooling sequence for the non-sheet-passing portion, hence, with the temperature detecting portions T1 and T3 not being required, the cost of the temperature detecting portions T1 and T3 can be decreased.

If an air blowing portion using a fan is included in the cooling control portion, the output of the fan may be changed instead of changing the cooling time in the above mentioned cooling sequence for the non-sheet-passing portion. In this case, it is preferable that the output of the fan when the cooling control portion executes the air blowing operation is set using a fan output table, based on the number of pages of the narrow sheet which were continuously passed in the previous print job, and the image density in the non-sheet-passing region S of the wide sheet. For example, when the image density in the non-sheet-passing region S is in the low density range, control to decrease the output of the fan is performed, instead of the control to decrease the cooling time by the fan. Thereby the power consumption and noise of the fan can be reduced.

Example 3

Example 3 will be described below.

In this example, the configurations of the heater 300 and the cooling control sequence are different from Example 1. In Example 1, the heat generating element of the heater 300 is a single element, but in Example 3, the heater 300 is constituted by a plurality of heat generating elements disposed in the longer side direction, and each of the heat generating elements can be controlled independently. In this example, a method of reducing the downtime using the above configuration will be described. In Example 3, the redundant content of Example 1 will be omitted, and the same composing element or portion as Example 1 is described using the same reference sign.

Figure 11:
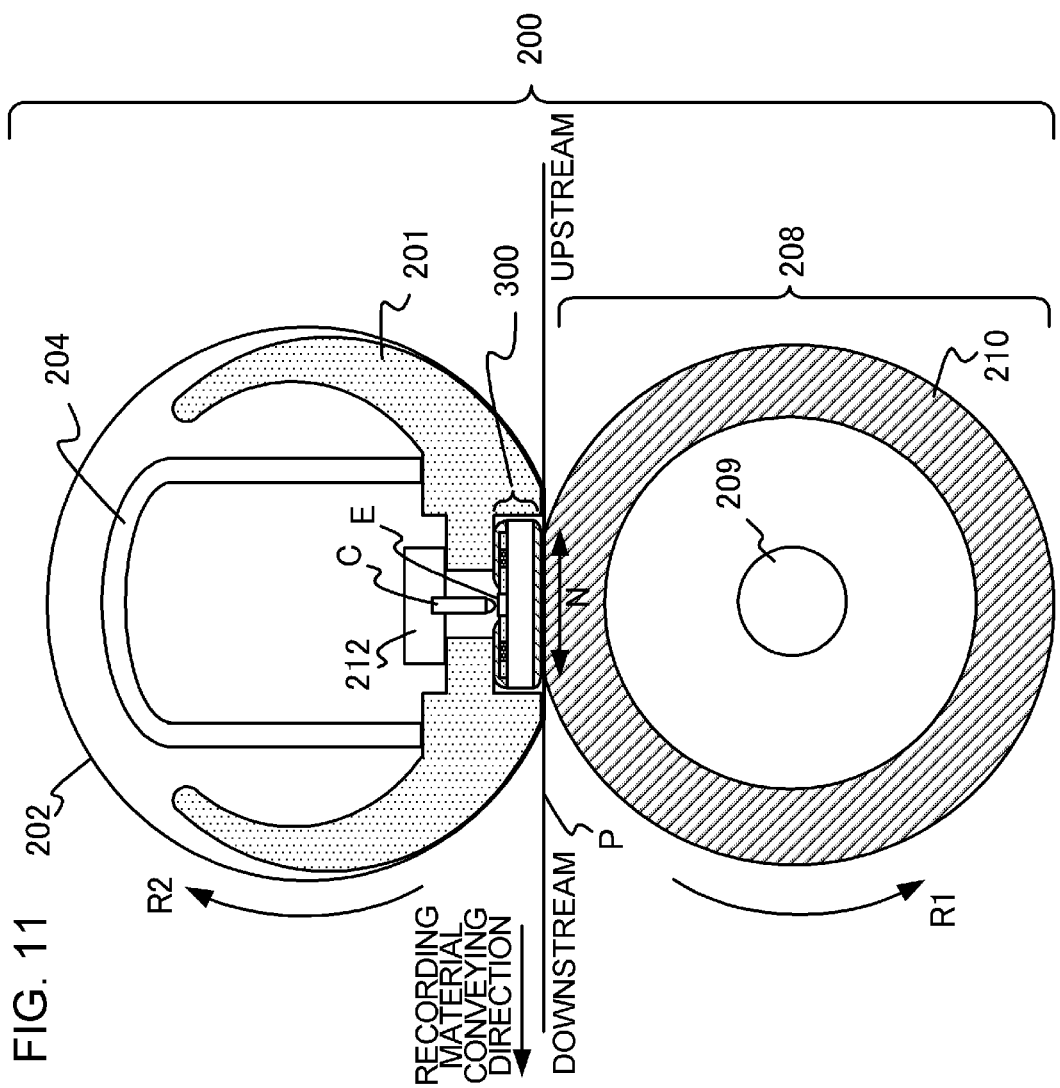
FIG. 11 is a schematic cross-sectional view depicting an image heating apparatus according to Example 3.

FIG. 11 is a schematic cross-sectional view of the image heating apparatus 200 according to this example. In the heater 300, an electrode E is disposed on the opposite side of the fixing nip portion N, and power is fed to the electrode E via an electric contact C.

Figure 12A:
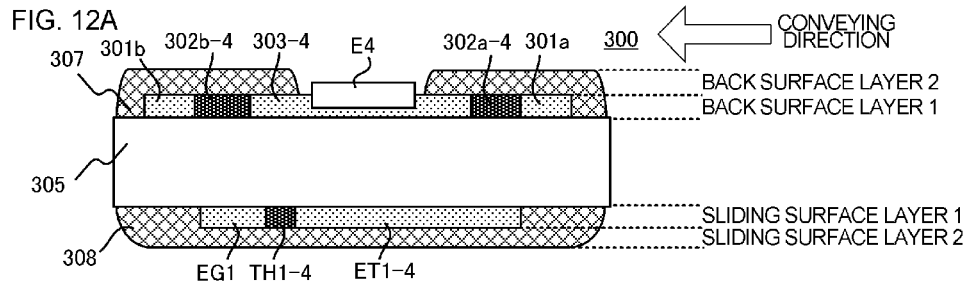
FIG. 12A to FIG. 12C are diagrams depicting the configuration of a heater according to Example 3.
Figure 12B:
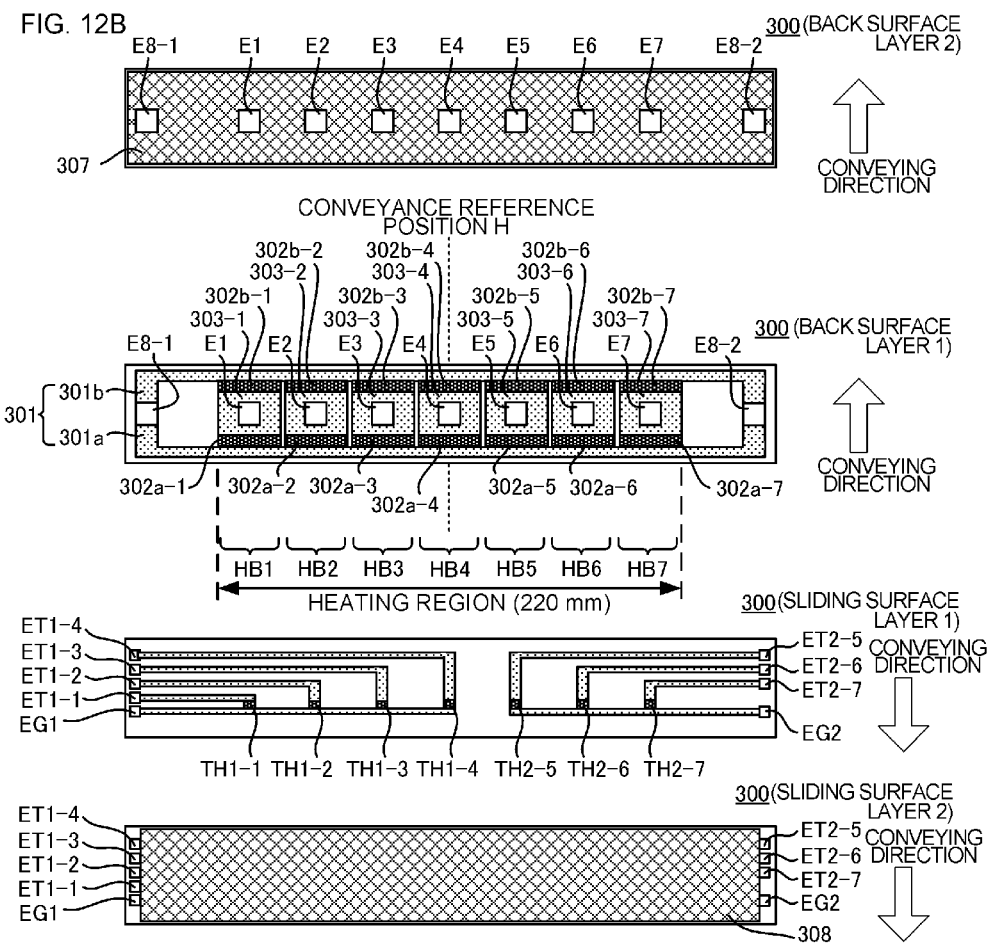
Figure 12C:
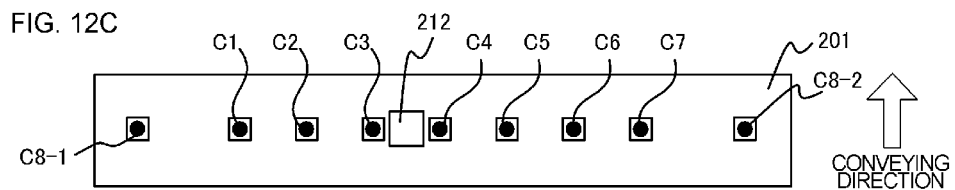

The configuration of the heater 300 according to this example will be described with reference to FIG. 12A to FIG. 12C. FIG. 12A is a cross-sectional view of the heater 300, FIG. 12B is a plan view of each layer of the heater 300, and FIG. 12C is a diagram depicting the method of connecting the electric contacts C to the heater 300. In FIG. 12B, a conveyance reference position H of the recording material P in the image forming apparatus 100 of this example is indicated. In this example, the conveyance reference is the center, and the recording material P is conveyed such that the center of the recording material P (in the direction orthogonal to the recording material conveying direction) moves along the conveyance reference position H. FIG. 12A is a cross-sectional view of the heater 300 at the conveyance reference position H.

The heater 300 includes a substrate 305, a back surface layer 1 which is disposed on the substrate 305, a back surface layer 2 which covers the back surface layer 1, a sliding surface layer 1 which is disposed on the opposite surface of the back surface layer 1 on the substrate 305, and the sliding surface layer 2 which covers the sliding surface layer 1.

The back surface layer 1 includes the conductors 301 (301a, 301b) which are disposed in the longer side direction of the heater 300. The conductors 301 are separated into a conductor 301a and a conductor 301b, and the conductor 301b is disposed at the downstream side of the conductor 301a in the conveying direction of the recording material P. The back surface layer 1 also includes the conductors 303 (303-1 to 303-7) which are disposed in parallel with the conductors 301a and 301b. The conductors 303 are disposed between the conductor 301a and the conductor 301b in the longer side direction of the heater 300.

Furthermore, the back surface layer 1 includes heat generating elements 302a (302a-1 to 302a-7) and heat generating elements 302b (302b-1 to 302b-7). The heat generating elements 302a are disposed between the conductor 301a and the conductor 303, and are heated by power supplied via the conductor 301a and the conductor 303. The heat generating elements 302b are disposed between the conductor 301b and the conductor 303, and are heated by power supplied via the conductor 301b and the conductor 303.

A heating segment, constituted by the conductors 301, conductors 303, heat generating elements 302a and heat generating elements 302b, is divided into seven heat generating blocks (HB1 to HB7) in the longer side direction of the heater 300. In other words, the heat generating elements 302a are divided into seven regions of heat generating elements 302a-1 to 302a-7 in the longer side direction of the heater 300. The heat generating elements 302b are divided into seven regions of heat generating elements 302b-1 to 302b-7 in the longer side direction of the heater 300. Further, the conductors 303 are divided into seven regions of the conductors 303-1 to 303-7 corresponding to the divided positions of the heat generating elements 302a and 302b. The heating value of each of the seven heat generating blocks (HB1 to HB7) is controlled individually by controlling the power supplied to each heat generating resistor in each block.

The heat generating region of this example is from the left end of the heat generating block HB1 to the right end of the heat generating block HB7 in FIG. 12B, and the length thereof is 220 mm. The length of each heat generating block in the longer side direction is approximately the same, 31 mm, but this length may be different from each other.

The back surface layer 1 includes the electrodes E (E1 to E7 and E8-1 and E8-2). The electrodes E1 to E7 are disposed in the regions of the conductors 303-1 to 303-7 respectively, and supply power to the heat generating blocks HB1 to HB7 respectively via the conductors 303-1 to 303-7. The electrodes E8-1 and E8-2 are disposed so as to connect to the conductors 301 respectively at the edges of the heater 300 in the longer side direction, and supply power to the heat generating blocks HB1 to HB7 respectively via the conductors 301. In this example, the electrodes E8-1 and E8-2 are disposed on both ends of the heater 300 in the longer side direction, but the electrode E8-1 only may be disposed on one side (the electrode E8-2 is not disposed). Further, the power is supplied to the conductors 301a and 301b using a common electrode, but an individual electrode may be disposed for the conductors 301a and 301b respectively, so as to supply power independently.

The back surface layer 2 is constituted by a surface protection layer 307 having insulation properties (glass in this example), and covers the conductors 301, conductors 303, and heat generating elements 302a and 302b. The surface protection layer 307 is formed on the entire back surface layer 2 except for the portion of the electrode E, so that the electric contact C can be connected to the electrode E from the back surface layer 2 side of the heater.

The sliding surface layer 1 is disposed on the substrate 305 on the opposite side surface of the surface on which the back surface layer 1 is disposed, and includes the thermistors TH (TH1-1 to TH1-4 and TH2-5 to TH2-7) which are temperature detecting portions to detect the temperature of each heat generating block HB1 to HB7. The thermistors TH are constituted by a material having a positive temperature coefficient (PTC) characteristic or a negative temperature coefficient (NTC) characteristic (the heater of this example has an NTC characteristic), and can detect the temperatures of all the heat generating blocks by detecting the resistance values of the thermistors. The sliding surface layer 1 includes the conductors ET (ET1-1 to ET1-4 and ET2-5 to ET2-7) and the conductors EG (EG1, EG2) to supply power to the thermistors TH and detect the resistance values thereof. The conductors ET1-1 to ET1-4 are connected to the thermistors TH1-1 to TH1-4 respectively. The conductors ET2-5 to ET2-7 are connected to the thermistors TH2-5 to TH2-7 respectively. The conductor EG1 is connected to the four thermistors TH1-1 to TH1-4, and forms a common conductive path. The conductor EG2 is connected to the three thermistors TH2-5 to TH2-7, and forms a common conductive path. The conductors ET and the conductors EG are formed at the edges of the heater 300 respectively in the longer side direction, and are connected to the control circuit 400 at the edges of the heater 300 in the longer side direction via electric contacts (not illustrated).

The sliding surface layer 2 is constituted by a surface protection layer 308 having sliding properties and insulation properties (glass in this example), and covers the thermistors TH, conductors ET and conductors EG with ensuring sliding with respect to the inner surface of the fixing film 202. The surface protection layer 308 is formed on the entire sliding surface layer 2 except for both ends of the heater 300 in the longer side direction, so that the electric contacts can be disposed on the conductors ET and conductors EG.

The method of connecting the electric contact C to each electrode E will be described next. FIG. 12C is a plan view of the state of connecting the electric contact C to each electrode E when viewed from the side of the heater holding member 201. Through holes are opened on the heater holding member 201 at positions corresponding to the electrodes E (E1 to E7, E8-1 and E8-2). At each through hole position, the electric contact C (C1 to C7, C8-1 and C8-2) is electrically connected to the electrode E (E1 to E7, E8-1 and E8-2) by such a method as energization using a spring or welding. The electric contact C is connected to the control circuit 400 via a conductive material (not illustrated) disposed between the metal stay 204 and the heater holding member 201.

FIG. 13 is a diagram depicting a heating region Ai (i=1 to 7) according to this example, in comparison with the sheet width of a letter size sheet. The heating region Ai (i=1 to 7) is a region in the fixing nip portion N corresponding to each heat generating block HB1 to HB7 (region heated by each heat generating block HB1 to HB7), and each heating region A1 to A7 is heated by heating of each heat generating block HB1 to HB7 respectively. The total length of the heating regions A1 to A7 is 220 mm, and each region is generated by evenly dividing this by seven (L=31.4 mm).

Figure 14:
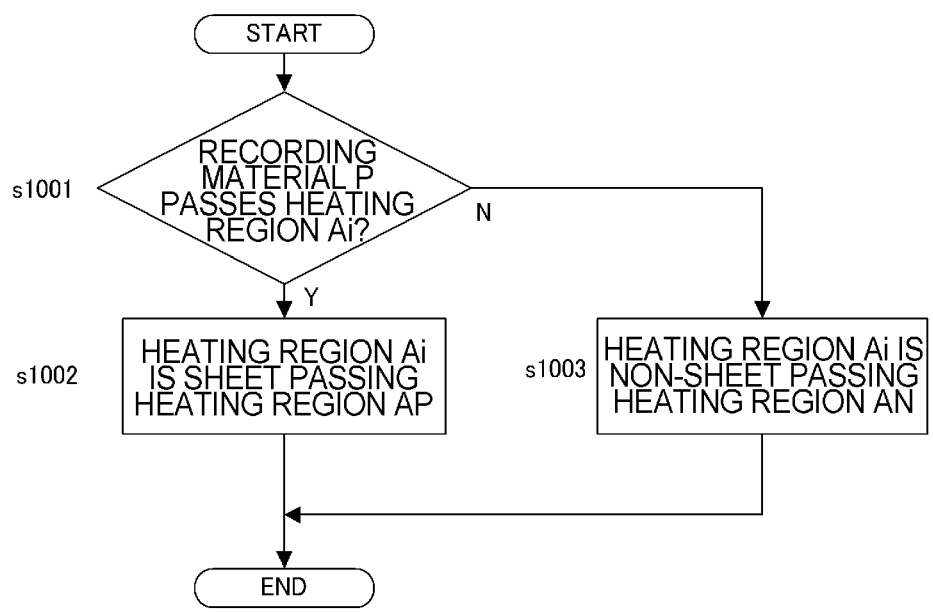
FIG. 14 is a flow chart depicting a processing to classify each heating region according to Example 3.

FIG. 14 is a flow chart depicting a processing to classify each heating region into a sheet-passing heating region AP and a non-sheet-passing heating region AN. As depicted in FIG. 14, each heating region Ai (i=1 to 7) is classified into the sheet-passing heating region AP and the non-sheet-passing heating region AN. The heating region Ai is classified based on the size information (image information) of the recording material P which is sent from an external device. In other words, it is determined whether the recording material P passes through each heating region Ai (s1001), and if it is determined that the recording material P passes through the heating region Ai, the heating region Ai is classified into the sheet-passing heating region AP (s1002). If it is determined that the recording material P does not pass through the heating region Ai, the heating region Ai is classified into the non-sheet-passing heating region AN (s1003). This classification of the heating region Ai is used to control the heating value of each heat generating block HB1 to HB7.

The heating value of a heat generating block HBi, corresponding to a heating region Ai classified into the non-sheet-passing heating region AN, is controlled to be lower than the heating value of the heat generating block HBi, corresponding to a heating region Ai classified into the sheet-passing heating region AP. In this example, the heating value of a heat generating block HBi, corresponding to a heating region Ai classified into the sheet-passing heating region AP, is controlled to be 5% of the heating value of a heat generating block HBi, corresponding to a heating region Ai classified into the non-sheet-passing heating region AN.

The classification of each heating region Ai will be described in detail with reference to FIG. 15.

Figure 15:
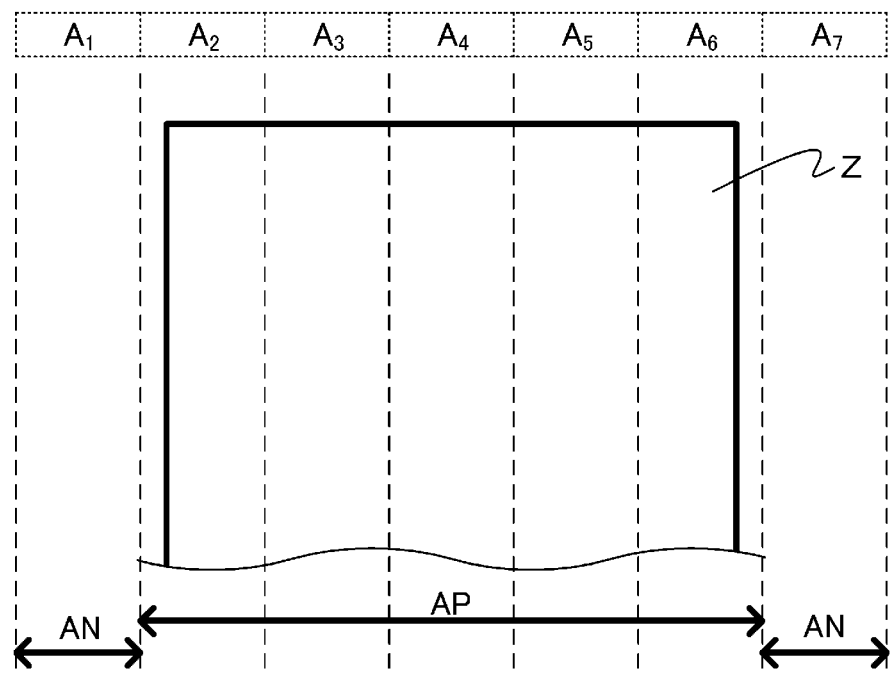
FIG. 15 is a diagram depicting a position of a narrow sheet and the classification of the heating regions according to Example 3.

FIG. 15 is a diagram depicting the position of an A5 size (148 mm×210 mm) narrow sheet Z, which is to pass in the vertical direction, and the classification of each heating region Ai. When the A5 size narrow sheet Z is passed through in the vertical direction, each heating region Ai is classified as shown in FIG. 15. In other words, the heating regions A1 and A7, where the narrow sheet Z does not pass, are classified into the non-sheet-passing heating region AN, and the heating regions A2, A3, A4, A5 and A6, where the narrow sheet Z passes, are classified into the sheet-passing heating region AP. In this case, the heat generating blocks HB1 and HB7 corresponding to the heating regions classified into the non-sheet-passing heating region AN are controlled to have lower heating values than those of the heat generating blocks HB2, HB3, HB4, HB5 and HB6 corresponding to the heating regions classified into the sheet-passing heating region AP.

As described above, each heating region Ai is classified into the non-sheet-passing heating region AN or the sheet-passing heating region AP, depending on the size of the recording material to be passed, and the heating value of the corresponding heat generating block is controlled respectively.

Cooling Sequence of Non-Sheet-Passing Portion

This example is characterized in that in an overlapped region V where the non-sheet-passing region S and the heating region Ai classified into the sheet-passing heating region AP in the passing of the narrow sheet are overlapped, the cooling finish temperature Tc is controlled with respect to the temperature rise in the non-sheet-passing portion to be generated, depending on the image density of the wide sheet in the overlapped region V.

FIG. 16 is a diagram depicting the narrow sheet X, the wide sheet Y, and the overlapped region V on the wide sheet Y.

The overlapped region V is a region on the wide sheet Y, and is a region where the non-sheet-passing region S and the sheet-passing heating region AP in the passing of the narrow sheet overlap.

FIG. 17 is a flow chart depicting the cooling sequence of the non-sheet-passing portion of this example.

The cooling sequence of the non-sheet-passing portion in this example includes the sheet width comparison sequence s701, the condition adjustment sequence s702 to change the cooling execution condition, and the execution sequence s703. The sheet width comparison sequence s701 in this example is the same as the sheet width comparison sequence s401 according to Example 1.

If the sheet width Wn of the sheet to be passed next is larger than the sheet width Wp of the previously passed recording material P, the condition adjustment sequence s702 is executed.

The cooling execution condition according to this example is that the detected values of the thermistors TH corresponding to the heating regions Ai on both ends of the sheet-passing heating region AP of passing the narrow sheet are at least the cooling finish temperature Tc. The heating regions Ai on both ends of the sheet-passing heating region AP in the passing of the narrow sheet include the overlapped regions V.

The thermistors TH corresponding to the heating regions Ai on both ends of the sheet-passing heating region AP will be described with reference to FIG. 15. In FIG. 15, the heating regions Ai on both ends of the sheet-passing heating region AP in the passing of the narrow sheet Z are A2 and S6 respectively. The thermistors TH corresponding to A2 and A6 are TH1-2 and TH2-6. In other words, in FIG. 15, the thermistors TH1 corresponding to the heating regions Ai on both ends of the sheet-passing heating region AP are TH1-2 and TH2-6.

If the sheet width Wn of the recording material P to be passed next is narrower than the sheet width Wp of the previously passed recording material P, the cooling sequence for the non-sheet-passing portion finishes, and the next printing is executed without cooling the non-sheet-passing portion.

A method of changing the cooling execution conditions with respect to the image density in the condition adjustment sequence s702 will be described in detail next, with reference to Table 6.

TABLE 6

Cooling execution condition with respect to image density

|  | Image information of overlapped region V | | | |
| --- | --- | --- | --- | --- |
|  | Image density 0% | Image density more than 0% and less than 4% | Image density at least 4% and less than 90% | Image density at least 90% |
| Cooling execution condition | Cooling control for non-sheet-passing portion is not executed | Detected temperatures of thermistors TH1 corresponding to the heating regions Ai on both ends are at least 220° C. | Detected temperatures of thermistors TH1 corresponding to the heating regions Ai on both ends are at least 200° C. | Detected temperatures of thermistors TH1 corresponding to the heating regions Ai on both ends are at least 205° C. |

The condition adjustment sequence s702 changes the cooling finish temperature Tc depending on the image density in the overlapped region V.

When the image density in the overlapped region V is 0%, that is, when no image exists in the overlapped region V, the cooling sequence for the non-sheet-passing portion finishes, and the next printing is executed without cooling the non-sheet-passing portion (s702-1). When the image density in the overlapped region V is more than 0% and less than 4%, the cooling finish temperature Tc is set to 220° C. (s702-2, s702-4). When the image density in the overlapped region V is at least 4% and less than 90%, the cooling finish temperature Tc is set to 200° C. (s702-3, s702-5). When the image density in the overlapped region V is at least 90%, the cooling finish temperature Tc is set to 205° C. (s702-3, s702-6).

After the condition adjustment sequence s702 finishes, the execution sequence s703 is executed. In the execution sequence s703, it is checked whether the detected values of the thermistors TH corresponding to the heating regions Ai on both ends of the sheet-passing heating region AP are at least the cooling finish temperature Tc (s703-1). If the detected values of the thermistors TH corresponding to the heating regions Ai on both ends of the sheet-passing heating region AP are less than the cooling finish temperature Tc, the cooling sequence for the non-sheet-passing portion finishes, and the next printing is executed in the execution sequence s703. If the detected values of the thermistors TH corresponding to the heating regions Ai on both ends of the sheet-passing heating region AP are at least the cooling finish temperature Tc, the cooling operation by the cooling control portion is executed (s703-2). The s703-1 and s703-2 are repeated to continue the cooling operation by the cooling control portion until the detected values of the thermistors TH corresponding to the heating regions Ai on both ends of the sheet-passing heating region AP become less than the cooling finish temperature Tc.

Effects of this Example

The effects of this example were confirmed by comparing this example with an image forming apparatus of a comparative example.

The comparative example will be described first. The image forming apparatus and the image heating apparatus of the comparative example are the same as those of this example. The differences of the comparative example from this example are: the condition adjustment sequence is not included in the cooling sequence for the non-sheet-passing portion; and the cooling finish temperature Tc is fixed to 200° C.

To confirm the effects of the image forming apparatus of this example, the comparative test was performed using the image forming apparatus of the comparative example and the image forming apparatus of this example. The content of the comparative test is the same as the comparative test described in Example 1.

Table 7 shows the set value of the cooling finish temperature Tc, and the result of measuring the time period of execution of the cooling sequence for the non-sheet-passing portion before executing the print job using wide sheet at each image density.

TABLE 7

Time period of execution of cooling sequence for non-sheet-passing portion

| | This example | | Comparative example | |
|---|---|---|---|---|
| Image density in printing region for wide sheet | Cooling finish temperature Tc | Time period of execution of cooling sequence for non-sheet-passing portion | Cooling finish temperature Tc | Time period of execution of cooling sequence for non-sheet-passing portion |
| 0% | — | 0 sec | 200° C. | 12 sec |
| 3% | 220° C. | 0 sec | | |
| 50% | 200° C. | 12 sec | | |
| 90% | 205° C. | 4 sec | | |

As Table 7 shows, in the image pattern printed in the comparative test, the time period of execution of the cooling sequence for the non-sheet-passing portion can be decreased, and a drop in productivity can be suppressed if the image forming apparatus of this example is used, compared with the comparative example. In other words, when the image density is 0% (that is, no image exists in the non-sheet-passing region S), and when the image density is more than 0% and less than 4%, the next printing can be executed without downtime. When the image density is at least 90%, downtime can be decreased considerably if the image forming apparatus of this example is used, compared with the comparative example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-236168, filed Dec. 5, 2016, which is hereby incorporated by reference herein in its entirety.

What is claimed is:

1. An image forming apparatus for forming a toner image on a recording material, comprising:
an image forming portion that forms the toner image on the recording material;
a fixing portion that fixes the toner image formed on the recording material onto the recording material by using heat; and
a control portion that controls the apparatus, wherein
the control portion compares a width of a first recording material with a width of a second recording material that is conveyed following the first recording material,
when a first toner image formed on the first recording material is fixed onto the first recording material by the fixing portion, and then a second toner image is formed on the second recording material of which a width is larger than that of the first recording material in the width direction of the recording material orthogonal to a conveying direction of the recording material, the control portion can execute a cooling sequence to cool a non-passing region of the fixing portion through which the second recording material passes but the first recording material does not pass, before the second toner image formed on the second recording material is fixed by the fixing portion,
when the width of the second recording material is smaller than that of the first recording material, the control portion performs fixing processing of the second recording material without executing the cooling sequence, and
the control portion sets an execution condition to execute the cooling sequence in accordance with information on the second toner image in the region of the second recording material corresponding to the non-passing region.

2. The image forming apparatus according to claim 1, wherein
the control portion sets a temperature to finish the cooling sequence in accordance with the information on the toner image in the region of the second recording material corresponding to the non-passing region.

3. The image forming apparatus according to claim 1, wherein
the control portion sets a time period to execute the cooling sequence in accordance with the information on the toner image in the region of the second recording material corresponding to the non-passing region.

4. The image forming apparatus according to claim 3, wherein
the control portion further sets the time period according to the number of pages of the first recording material.

5. The image forming apparatus according to claim 4, wherein
the control portion sets the time period to be longer as the number of pages of the first recording material is larger.

6. The image forming apparatus according to claim 1, wherein
the control portion further sets an execution condition to execute the cooling sequence in accordance with the number of pages of the first recording material.

7. The image forming apparatus according to claim 1, wherein
the fixing portion includes a pair of rotors that constitutes a fixing nip portion holding and conveying the recording material while implementing heating, and the cooling sequence is a sequence radiating heat by rotating the rotors.

8. The image forming apparatus according to claim 1, wherein
the fixing portion includes a heater including a plurality of heat generating elements which are disposed side by side in the direction orthogonal to the conveying direction of the recording material,
the control portion individually controls the plurality of heat generating elements in accordance with a size of the recording material, and
the control portion sets the execution condition in accordance with the information on the toner image on a region of the second recording material corresponding to the non-passing region, which is also an overlapped region, that is, a heating region that is heated when the first recording material passes through.

9. The image forming apparatus according to claim 1, wherein
the information on the toner image is density information on the toner image.

10. The image forming apparatus according to claim 1, wherein
the fixing portion includes a tubular film and a heater that contacts an inner surface of the film, and
the image on the recording material is heated via the film.

11. The image forming apparatus according to claim 10, wherein
the fixing portion further includes a pressure roller that constitutes, with the heater, a fixing nip portion nipping and conveying the recording material via the film.

12. The image forming apparatus according to claim 1, wherein
the fixing portion includes a tubular film and a heater being provided in an inner space of the film, and
the image on the recording material is heated via the film.

13. The image forming apparatus according to claim 12, wherein
the fixing portion further includes a pressure roller that constitutes, with the heater, a fixing nip portion nipping and conveying the recording material via the film.

14. An image forming apparatus for forming a toner image on a recording material, comprising:
an image forming portion that forms the toner image on the recording material;
a fixing portion that fixes the toner image formed on the recording material onto the recording material by using heat; and
a control portion that controls the apparatus,
wherein when a first toner image formed on a first recording material is fixed onto the first recording material by the fixing portion, and then a second toner image is formed on a second recording material of which width is larger than that of the first recording material in the width direction of the recording material orthogonal to a conveying direction of the recording material, the control portion can execute a cooling sequence to cool a non-passing region of the fixing portion through which the second recording material passes but the first recording material does not pass, before the second toner image formed on the second recording material is fixed by the fixing portion,
when the width of the second recording material is smaller than that of the first recording material, the control portion performs fixing processing of the second recording material without executing the cooling sequence, and
wherein the control portion forms the second toner image on the second recording material after the cooling sequence is executed in a case where there is the second toner image on a region of the second recording material corresponding to the non-passing region, and forms the second toner image on the second recording material without executing the cooling sequence in a case where there is no second toner image on the region of the second recording material corresponding to the non-passing region.

15. The image forming apparatus according to claim 14, wherein
the fixing portion includes a pair of rotors that constitute a fixing nip portion holding and conveying the recording material while implementing heating, and the cooling sequence is a sequence radiating heat by rotating the rotors.

16. The image forming apparatus according to claim 14, wherein
the information on the toner image is density information on the toner image.

17. The image forming apparatus according to claim 14, wherein
the fixing portion includes a tubular film and a heater that contacts an inner surface of the film, and
the image on the recording material is heated via the film.

18. The image forming apparatus according to claim 17, wherein
the fixing portion further includes a pressure roller that constitutes, with the heater, a fixing nip portion nipping and conveying the recording material via the film.

19. The image forming apparatus according to claim 14, wherein
the fixing portion includes a tubular film and a heater being provided in an inner space of the film, and
the image on the recording material is heated via the film.

20. The image forming apparatus according to claim 19, wherein
the fixing portion further includes a pressure roller that constitutes, with the heater, a fixing nip portion nipping and conveying the recording material via the film.

* * * * *